(12) United States Patent
Liu

(10) Patent No.: US 8,601,537 B2
(45) Date of Patent: Dec. 3, 2013

(54) SYSTEM AND METHOD FOR DATA MINING AND SECURITY POLICY MANAGEMENT

(75) Inventor: Weimin Liu, Palo Alto, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/424,249

(22) Filed: Mar. 19, 2012

(65) Prior Publication Data

US 2012/0179687 A1    Jul. 12, 2012

Related U.S. Application Data

(63) Continuation of application No. 12/171,232, filed on Jul. 10, 2008, now Pat. No. 8,205,242.

(51) Int. Cl.
*G06F 17/00* (2006.01)

(52) U.S. Cl.
USPC .............................................. 726/1

(58) Field of Classification Search
USPC .............. 726/1; 713/165, 167, 176, 180, 193; 707/741, E17.002, E17.014
See application file for complete search history.

(56) References Cited

U.S. PATENT DOCUMENTS

| | | |
|---|---|---|
| 4,286,255 A | 8/1981 | Siy |
| 4,710,957 A | 12/1987 | Bocci et al. |
| 5,249,289 A | 9/1993 | Thamm et al. |
| 5,465,299 A | 11/1995 | Matsumoto et al. |
| 5,479,654 A | 12/1995 | Squibb |
| 5,497,489 A | 3/1996 | Menne |
| 5,542,090 A | 7/1996 | Henderson et al. |
| 5,557,747 A | 9/1996 | Rogers et al. |
| 5,623,652 A | 4/1997 | Vora et al. |
| 5,768,578 A | 6/1998 | Kirk |
| 5,781,629 A | 7/1998 | Haber et al. |
| 5,787,232 A | 7/1998 | Greiner et al. |
| 5,794,052 A | 8/1998 | Harding |
| 5,813,009 A | 9/1998 | Johnson et al. |
| 5,873,081 A | 2/1999 | Harel |
| 5,937,422 A | 8/1999 | Nelson et al. |
| 5,943,670 A | 8/1999 | Prager |
| 5,987,610 A | 11/1999 | Franczek et al. |
| 5,995,111 A | 11/1999 | Morioka et al. |
| 6,026,411 A | 2/2000 | Delp |
| 6,073,142 A | 6/2000 | Geiger et al. |
| 6,078,953 A | 6/2000 | Vaid et al. |
| 6,094,531 A | 7/2000 | Allison et al. |
| 6,108,697 A | 8/2000 | Raymond et al. |
| 6,122,379 A | 9/2000 | Barbir |

(Continued)

FOREIGN PATENT DOCUMENTS

| | | |
|---|---|---|
| EP | 2499806 | 9/2012 |
| WO | WO 2004/008310 | 1/2004 |
| WO | WO 2012/060892 | 5/2012 |

OTHER PUBLICATIONS

Walter Allasia and Franesco Gallo, "Indexing and Retrieval of Multimedia Metadata on a Secure DHT", University of Torino, Italy, Department of Computer Science, Aug. 31, 2008.*

(Continued)

*Primary Examiner* — Samson Lemma
(74) *Attorney, Agent, or Firm* — Patent Capital Group

(57) ABSTRACT

A system and method to generate and maintain controlled growth DAG are described. The controlled growth DAG conveys information about objects captured by a capture system.

17 Claims, 25 Drawing Sheets

(56) References Cited

U.S. PATENT DOCUMENTS

| | | | |
|---|---|---|---|
| 6,161,102 A | 12/2000 | Yanagihara et al. |
| 6,175,867 B1 | 1/2001 | Taghadoss |
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 | 9/2001 | Richards |
| 6,336,186 B1 | 1/2002 | Dyksterhouse et al. |
| 6,343,376 B1 | 1/2002 | Saxe et al. |
| 6,356,885 B2 | 3/2002 | Ross et al. |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,411,952 B1 | 6/2002 | Bharat et al. |
| 6,457,017 B2 | 9/2002 | Watkins et al. |
| 6,460,050 B1 | 10/2002 | Pace et al. |
| 6,493,761 B1 | 12/2002 | Baker et al. |
| 6,499,105 B1 | 12/2002 | Yoshiura et al. |
| 6,502,091 B1 | 12/2002 | Chundi et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,556,964 B2 | 4/2003 | Haug et al. |
| 6,556,983 B1 | 4/2003 | Altschuler et al. |
| 6,571,275 B1 | 5/2003 | Dong et al. |
| 6,584,458 B1 | 6/2003 | Millett et al. |
| 6,598,033 B2 | 7/2003 | Ross et al. |
| 6,629,097 B1 | 9/2003 | Keith |
| 6,662,176 B2 | 12/2003 | Brunet et al. |
| 6,665,662 B1 | 12/2003 | Kirkwood et al. |
| 6,675,159 B1 | 1/2004 | Lin et al. |
| 6,691,209 B1 | 2/2004 | O'Connell |
| 6,754,647 B1 | 6/2004 | Tackett et al. |
| 6,757,646 B2 | 6/2004 | Marchisio |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,804,627 B1 | 10/2004 | Marokhovsky et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,976,053 B1 * | 12/2005 | Tripp et al. ............ 709/202 |
| 6,978,297 B1 | 12/2005 | Piersol |
| 6,978,367 B1 | 12/2005 | Hind et al. |
| 7,007,020 B1 | 2/2006 | Chen et al. |
| 7,020,654 B1 | 3/2006 | Najmi |
| 7,020,661 B1 | 3/2006 | Cruanes et al. |
| 7,062,572 B1 | 6/2006 | Hampton |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,130,587 B2 | 10/2006 | Hikokubo et al. |
| 7,158,983 B2 | 1/2007 | Willse et al. |
| 7,185,073 B1 | 2/2007 | Gai et al. |
| 7,185,192 B1 | 2/2007 | Kahn |
| 7,194,483 B1 | 3/2007 | Mohan et al. |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,254,632 B2 | 8/2007 | Zeira et al. |
| 7,266,845 B2 | 9/2007 | Hypponen |
| 7,272,724 B2 | 9/2007 | Tarbotton et al. |
| 7,277,957 B2 | 10/2007 | Rowley et al. |
| 7,290,048 B1 | 10/2007 | Barnett et al. |
| 7,293,067 B1 | 11/2007 | Maki et al. |
| 7,293,238 B1 | 11/2007 | Brook et al. |
| 7,296,011 B2 * | 11/2007 | Chaudhuri et al. ............ 1/1 |
| 7,296,070 B2 | 11/2007 | Sweeney et al. |
| 7,296,088 B1 | 11/2007 | Padmanabhan et al. |
| 7,296,232 B1 | 11/2007 | Burdick et al. |
| 7,299,277 B1 | 11/2007 | Moran et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,467,202 B2 | 12/2008 | Savchuk |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 | 3/2009 | Schuba et al. |
| 7,506,055 B2 | 3/2009 | McClain et al. |
| 7,506,155 B1 | 3/2009 | Stewart et al. |
| 7,509,677 B2 | 3/2009 | Saurabh et al. |
| 7,516,492 B1 | 4/2009 | Nisbet et al. |
| 7,539,683 B1 * | 5/2009 | Satoh et al. ............ 1/1 |
| 7,551,629 B2 | 6/2009 | Chen et al. |
| 7,577,154 B1 | 8/2009 | Yung et al. |
| 7,581,059 B2 | 8/2009 | Gupta et al. |
| 7,596,571 B2 | 9/2009 | Sifry |
| 7,599,844 B2 | 10/2009 | King et al. |
| 7,657,104 B2 | 2/2010 | Deninger et al. |
| 7,664,083 B1 | 2/2010 | Cermak et al. |
| 7,685,254 B2 | 3/2010 | Pandya |
| 7,689,614 B2 * | 3/2010 | de la Iglesia et al. ......... 707/713 |
| 7,730,011 B1 | 6/2010 | Deninger et al. |
| 7,739,080 B1 | 6/2010 | Beck et al. |
| 7,760,730 B2 | 7/2010 | Goldschmidt et al. |
| 7,760,769 B1 | 7/2010 | Lovett et al. |
| 7,774,604 B2 | 8/2010 | Lowe et al. |
| 7,814,327 B2 | 10/2010 | Ahuja et al. |
| 7,818,326 B2 | 10/2010 | Deninger et al. |
| 7,844,582 B1 | 11/2010 | Arbilla et al. |
| 7,849,065 B2 * | 12/2010 | Kamani et al. ............ 707/705 |
| 7,899,828 B2 | 3/2011 | de la Iglesia et al. |
| 7,907,608 B2 | 3/2011 | Liu et al. |
| 7,921,072 B2 | 4/2011 | Bohannon et al. |
| 7,930,540 B2 | 4/2011 | Ahuja et al. |
| 7,949,849 B2 | 5/2011 | Lowe et al. |
| 7,958,227 B2 | 6/2011 | Ahuja et al. |
| 7,962,591 B2 | 6/2011 | Deninger et al. |
| 7,984,175 B2 | 7/2011 | de la Iglesia et al. |
| 7,996,373 B1 | 8/2011 | Zoppas et al. |
| 8,005,863 B2 | 8/2011 | de la Iglesia et al. |
| 8,010,689 B2 | 8/2011 | Deninger et al. |
| 8,055,601 B2 | 11/2011 | Pandya |
| 8,166,307 B2 | 4/2012 | Ahuja et al. |
| 8,176,049 B2 | 5/2012 | Deninger et al. |
| 8,200,026 B2 | 6/2012 | Deninger et al. |
| 8,205,242 B2 | 6/2012 | Liu et al. |
| 8,271,794 B2 | 9/2012 | Lowe et al. |
| 8,301,635 B2 | 10/2012 | de la Iglesia et al. |
| 8,307,007 B2 | 11/2012 | de la Iglesia et al. |
| 8,307,206 B2 | 11/2012 | Ahuja et al. |
| 8,463,800 B2 | 6/2013 | Deninger et al. |
| 8,473,442 B1 | 6/2013 | Deninger et al. |
| 2001/0013024 A1 | 8/2001 | Takahashi et al. |
| 2001/0032310 A1 | 10/2001 | Corella |
| 2001/0037324 A1 | 11/2001 | Agrawal et al. |
| 2001/0046230 A1 | 11/2001 | Rojas |
| 2002/0032677 A1 | 3/2002 | Morgenthaler et al. |
| 2002/0032772 A1 | 3/2002 | Olstad et al. |
| 2002/0052896 A1 | 5/2002 | Streit et al. |
| 2002/0065956 A1 | 5/2002 | Yagawa et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0128903 A1 | 9/2002 | Kernahan |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0055962 A1 | 3/2003 | Freund et al. |

(56) References Cited

U.S. PATENT DOCUMENTS

| | | |
|---|---|---|
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105716 A1 | 6/2003 | Sutton et al. |
| 2003/0105739 A1 | 6/2003 | Essafi et al. |
| 2003/0105854 A1 | 6/2003 | Thorsteinsson et al. |
| 2003/0131116 A1 | 7/2003 | Jain et al. |
| 2003/0135612 A1 | 7/2003 | Huntington et al. |
| 2003/0167392 A1 | 9/2003 | Fransdonk |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2003/0233411 A1 | 12/2003 | Parry et al. |
| 2004/0001498 A1 | 1/2004 | Chen et al. |
| 2004/0010484 A1 | 1/2004 | Foulger et al. |
| 2004/0015579 A1 | 1/2004 | Cooper et al. |
| 2004/0036716 A1 | 2/2004 | Jordahl |
| 2004/0054779 A1 | 3/2004 | Takeshima et al. |
| 2004/0059736 A1 | 3/2004 | Willse et al. |
| 2004/0059920 A1 | 3/2004 | Godwin |
| 2004/0071164 A1 | 4/2004 | Baum |
| 2004/0111406 A1 | 6/2004 | Udeshi et al. |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0122936 A1 | 6/2004 | Mizelle et al. |
| 2004/0139120 A1 | 7/2004 | Clark et al. |
| 2004/0181513 A1 | 9/2004 | Henderson et al. |
| 2004/0181690 A1 | 9/2004 | Rothermel et al. |
| 2004/0193594 A1 | 9/2004 | Moore et al. |
| 2004/0194141 A1 | 9/2004 | Sanders |
| 2004/0196970 A1 | 10/2004 | Cole |
| 2004/0205457 A1 | 10/2004 | Bent et al. |
| 2004/0215612 A1 | 10/2004 | Brody |
| 2004/0220944 A1 | 11/2004 | Behrens et al. |
| 2004/0230572 A1 | 11/2004 | Omoigui |
| 2004/0249781 A1 | 12/2004 | Anderson |
| 2004/0267753 A1 | 12/2004 | Hoche |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033726 A1 | 2/2005 | Wu et al. |
| 2005/0033747 A1 | 2/2005 | Wittkotter |
| 2005/0033803 A1 | 2/2005 | Vleet et al. |
| 2005/0038788 A1 | 2/2005 | Dettinger et al. |
| 2005/0038809 A1 | 2/2005 | Abajian et al. |
| 2005/0044289 A1 | 2/2005 | Hendel et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0075103 A1 | 4/2005 | Hikokubo et al. |
| 2005/0086252 A1 | 4/2005 | Jones et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138110 A1 | 6/2005 | Redlich et al. |
| 2005/0138242 A1 | 6/2005 | Pope et al. |
| 2005/0138279 A1 | 6/2005 | Somasundaram |
| 2005/0149494 A1 | 7/2005 | Lindh et al. |
| 2005/0149504 A1 | 7/2005 | Ratnaparkhi |
| 2005/0166066 A1 | 7/2005 | Ahuja et al. |
| 2005/0177725 A1* | 8/2005 | Lowe et al. .................. 713/176 |
| 2005/0180341 A1 | 8/2005 | Nelson et al. |
| 2005/0182765 A1 | 8/2005 | Liddy |
| 2005/0188218 A1 | 8/2005 | Walmsley et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0273614 A1* | 12/2005 | Ahuja et al. .................. 713/176 |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0075228 A1 | 4/2006 | Black et al. |
| 2006/0080130 A1 | 4/2006 | Choksi |
| 2006/0083180 A1 | 4/2006 | Baba et al. |
| 2006/0106793 A1 | 5/2006 | Liang |
| 2006/0106866 A1 | 5/2006 | Green et al. |
| 2006/0150249 A1 | 7/2006 | Gassen et al. |
| 2006/0167896 A1 | 7/2006 | Kapur et al. |
| 2006/0184532 A1 | 8/2006 | Hamada et al. |
| 2006/0235811 A1 | 10/2006 | Fairweather |
| 2006/0242126 A1 | 10/2006 | Fitzhugh |
| 2006/0242313 A1 | 10/2006 | Le et al. |
| 2006/0251109 A1 | 11/2006 | Muller et al. |
| 2006/0253445 A1 | 11/2006 | Huang et al. |
| 2006/0271506 A1 | 11/2006 | Bohannon et al. |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0011309 A1 | 1/2007 | Brady et al. |
| 2007/0028039 A1 | 2/2007 | Gupta et al. |
| 2007/0036156 A1 | 2/2007 | Liu et al. |
| 2007/0050334 A1 | 3/2007 | Deninger et al. |
| 2007/0050381 A1 | 3/2007 | Hu et al. |
| 2007/0050467 A1 | 3/2007 | Borrett et al. |
| 2007/0081471 A1 | 4/2007 | Talley et al. |
| 2007/0094394 A1 | 4/2007 | Singh et al. |
| 2007/0106337 A1* | 5/2007 | Stern et al. .................. 707/5 |
| 2007/0106685 A1 | 5/2007 | Houh et al. |
| 2007/0106693 A1* | 5/2007 | Houh et al. .................. 707/104.1 |
| 2007/0110089 A1 | 5/2007 | Essafi et al. |
| 2007/0112837 A1* | 5/2007 | Houh et al. .................. 707/102 |
| 2007/0112838 A1 | 5/2007 | Bjarnestam et al. |
| 2007/0116366 A1 | 5/2007 | Deninger et al. |
| 2007/0124384 A1* | 5/2007 | Howell et al. .................. 709/206 |
| 2007/0136599 A1 | 6/2007 | Suga |
| 2007/0140128 A1 | 6/2007 | Klinker et al. |
| 2007/0143559 A1* | 6/2007 | Yagawa .................. 711/170 |
| 2007/0162609 A1 | 7/2007 | Pope et al. |
| 2007/0220607 A1 | 9/2007 | Sprosts et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0271254 A1* | 11/2007 | Iglesia et al. .................. 707/5 |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0027971 A1 | 1/2008 | Statchuk |
| 2008/0028467 A1 | 1/2008 | Kommareddy et al. |
| 2008/0030383 A1 | 2/2008 | Cameron |
| 2008/0082497 A1* | 4/2008 | Leblang et al. .................. 707/3 |
| 2008/0091408 A1 | 4/2008 | Roulland et al. |
| 2008/0112411 A1 | 5/2008 | Stafford et al. |
| 2008/0115125 A1 | 5/2008 | Stafford et al. |

(56) References Cited

U.S. PATENT DOCUMENTS

| | | | |
|---|---|---|---|
| 2008/0140657 | A1 | 6/2008 | Azvine et al. |
| 2008/0141117 | A1 | 6/2008 | King et al. |
| 2008/0159627 | A1* | 7/2008 | Sengamedu ............... 382/190 |
| 2008/0235163 | A1 | 9/2008 | Balasubramanian et al. |
| 2008/0263019 | A1 | 10/2008 | Harrison et al. |
| 2008/0270462 | A1 | 10/2008 | Thomsen |
| 2009/0070327 | A1 | 3/2009 | Loeser et al. |
| 2009/0070328 | A1 | 3/2009 | Loeser et al. |
| 2009/0070459 | A1 | 3/2009 | Cho et al. |
| 2009/0100055 | A1 | 4/2009 | Wang |
| 2009/0157659 | A1* | 6/2009 | Satoh et al. ............... 707/5 |
| 2009/0178110 | A1 | 7/2009 | Higuchi |
| 2009/0187568 | A1 | 7/2009 | Morin |
| 2009/0216752 | A1 | 8/2009 | Terui et al. |
| 2009/0222442 | A1* | 9/2009 | Houh et al. ............... 707/5 |
| 2009/0232391 | A1 | 9/2009 | Deninger et al. |
| 2009/0235150 | A1* | 9/2009 | Berry ............... 715/205 |
| 2009/0254532 | A1 | 10/2009 | Yang et al. |
| 2009/0288164 | A1 | 11/2009 | Adelstein et al. |
| 2009/0300709 | A1 | 12/2009 | Chen et al. |
| 2009/0326925 | A1 | 12/2009 | Crider et al. |
| 2010/0011016 | A1 | 1/2010 | Greene |
| 2010/0011410 | A1 | 1/2010 | Liu |
| 2010/0037324 | A1 | 2/2010 | Grant et al. |
| 2010/0088317 | A1 | 4/2010 | Bone et al. |
| 2010/0100551 | A1 | 4/2010 | Knauft et al. |
| 2010/0121853 | A1 | 5/2010 | de la Iglesia et al. |
| 2010/0174528 | A1 | 7/2010 | Oya et al. |
| 2010/0185622 | A1 | 7/2010 | Deninger et al. |
| 2010/0191732 | A1 | 7/2010 | Lowe et al. |
| 2010/0195909 | A1 | 8/2010 | Wasson et al. |
| 2010/0268959 | A1 | 10/2010 | Lowe et al. |
| 2010/0332502 | A1 | 12/2010 | Carmel et al. |
| 2011/0004599 | A1 | 1/2011 | Deninger et al. |
| 2011/0040552 | A1 | 2/2011 | Van Guilder et al. |
| 2011/0131199 | A1 | 6/2011 | Simon et al. |
| 2011/0149959 | A1 | 6/2011 | Liu et al. |
| 2011/0167212 | A1 | 7/2011 | Lowe et al. |
| 2011/0167265 | A1 | 7/2011 | Ahuja et al. |
| 2011/0196911 | A1 | 8/2011 | de la Iglesia et al. |
| 2011/0197284 | A1 | 8/2011 | Ahuja et al. |
| 2011/0208861 | A1 | 8/2011 | Deninger et al. |
| 2011/0219237 | A1 | 9/2011 | Ahuja et al. |
| 2011/0258197 | A1 | 10/2011 | de la Iglesia et al. |
| 2011/0276575 | A1 | 11/2011 | de la Iglesia et al. |
| 2011/0276709 | A1 | 11/2011 | Deninger et al. |
| 2012/0114119 | A1 | 5/2012 | Ahuja et al. |
| 2012/0180137 | A1 | 7/2012 | Liu |
| 2012/0191722 | A1 | 7/2012 | Deninger et al. |

OTHER PUBLICATIONS

U.S. Appl. No. 13/337,737, filed Dec. 27, 2011, entitled "System and Method for Providing Data Protection Workflows in a Network Environment", Inventor(s) Ratinder Paul Singh Ahuja, et al.
U.S. Appl. No. 13/338,060, filed Dec. 27, 2011, entitled "System and Method for Providing Data Protection Workflows in a Network Environment", Inventor(s) Ratinder Paul Singh Ahuja, et al.
U.S. Appl. No. 13/338,159, filed Dec. 27, 2011, entitled "System and Method for Providing Data Protection Workflows in a Network Environment", Inventor(s) Ratinder Paul Singh Ahuja, et al.
U.S. Appl. No. 13/338,195, filed Dec. 27, 2011, entitled "System and Method for Providing Data Protection Workflows in a Network Environment", Inventor(s) Ratinder Paul Singh Ahuja, et al.
Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, approximated copyright 2004-2005, printed Mar. 12, 2009.
Microsoft Outlook, Outlook, copyright 1995-2000, 2 pages.
Preneel, Bart, "Cryptographic Hash Functions", Proceedings of the 3rd Symposium on State and Progress of Research in Cryptography, 1993, pp. 161-171.
U.S. Appl. No. 11/254,436, filed Oct. 19, 2005, entitled "Attributes of Captured Objects in a Capture System," Inventor(s) William Deninger et al.
U.S. Appl. No. 11/900,964, filed Sep. 14, 2007, entitled "System and Method for Indexing a Capture System," Inventor(s) Ashok Doddapaneni et al.
U.S. Appl. No. 12/190,536, filed Aug. 12, 2008, entitled "Configuration Management for a Capture/Registration System," Inventor(s) Jitendra B. Gaitonde et al.
U.S. Appl. No. 12/352,720, filed Jan. 13, 2009, entitled "System and Method for Concept Building," Inventor(s) Ratinder Paul Singh Ahuja et al.
U.S. Appl. No. 12/354,688, filed Jan. 15, 2009, entitled "System and Method for Intelligent Term Grouping," Inventor(s) Ratinder Paul Ahuja et al.
U.S. Appl. No. 12/358,399, filed Jan. 23, 2009, entitled "System and Method for Intelligent State Management," Inventor(s) William Deninger et al.
U.S. Appl. No. 12/410,875, filed Mar. 25, 2009, entitled "System and Method for Data Mining and Security Policy Management," Inventor(s) Ratinder Paul Singh Ahuja et al.
U.S. Appl. No. 12/410,905, filed Mar. 25, 2009, entitled "System and Method for Managing Data and Policies," Inventor(s) Ratinder Paul Singh Ahuja et al.
U.S. Appl. No. 12/690,153, filed Jan. 20, 2010, entitled "Query Generation for a Capture System," Inventor(s) Erik de la Iglesia, et al.
U.S. Appl. No. 12/751,876, filed Mar. 31, 2010, entitled "Attributes of Captured Objects in a Capture System," Inventor(s) William Deninger, et al.
Mao et al. "MOT: Memory Online Tracing of Web Information System," Proceedings of the Second International Conference on Web Information Systems Engineering (Wise '01); pp. 271-277, (IEEE0-0/7695-1393-X/02) Aug. 7, 2002 (7 pages).
U.S. Appl. No. 13/422,791, filed on Mar. 16, 2012, entitled "System and Method for Data Mining and Security Policy Management", Inventor, Weimin Liu.
U.S. Appl. No. 13/431,678, filed on Mar. 27, 2012, entitled "Attributes of Captured Objects in a Capture System", Inventors William Deninger, et al.
U.S. Appl. No. 13/436,275, filed on Mar. 30, 2012, entitled "System and Method for Intelligent State Management", Inventors William Deninger, et al.
Han, OLAP Mining: An Integration of OLAP with Data Mining, Oct. 1997, pp. 1-18.
International Search Report and Written Opinion and Declaration of Non-Establishment of International Search Report for International Application No. PCT/US2011/024902 mailed Aug. 1, 2011 (8 pages).
Niemi, Constructing OLAP Cubes Based on Queries, Nov. 2001, pp. 1-7.
Schultz, Data Mining for Detection of New Malicious Executables, May 2001, pp. 1-13.
U.S. Appl. No. 12/829,220, filed Jul. 1, 2010, entitled "Verifying Captured Objects Before Presentation," Inventor(s) Rick Lowe, et al.
U.S. Appl. No. 12/873,061, filed Aug. 31, 2010, entitled "Document Registration," Inventor(s) Ratinder Paul Singh Ahuja, et al.
U.S. Appl. No. 12/873,860, filed Sep. 1, 2010, entitled "A System and Method for Word Indexing in a Capture System and Querying Thereof," Inventor(s) William Deninger, et al.
U.S. Appl. No. 12/939,340, filed Nov. 3, 2010, entitled "System and Method for Protecting Specified Data Combinations," Inventor(s) Ratinder Paul Singh Ahuja, et al.
U.S. Appl. No. 12/967,013, filed Dec. 13, 2010, entitled "Tag Data Structure for Maintaining Relational Data Over Captured Objects," Inventor(s) Erik de la Iglesia, et al.
U.S. Appl. No. 13/024,923, filed Feb. 10, 2011, entitled "High Speed Packet Capture," Inventor(s) Weimin Liu, et al.
U.S. Appl. No. 13/047,068, filed Mar. 14, 2011, entitled "Cryptographic Policy Enforcement," Inventor(s) Ratinder Paul Singh Ahuja, et al.
U.S. Appl. No. 13/049,533, filed Mar. 16, 2011, entitled "File System for a Capture System," Inventor(s) Rick Lowe, et al.

(56) References Cited

OTHER PUBLICATIONS

U.S. Appl. No. 13/089,158, filed Apr. 18, 2011, entitled "Attributes of Captured Objects in a Capture System," Inventor(s) Ratinder Paul Singh Ahuja, et al.
U.S. Appl. No. 13/099,516, filed May 3, 2011, entitled "Object Classification in a Capture System," Inventor(s) William Deninger, et al.
U.S. Appl. No. 13/168,739, filed Jun. 24, 2011, entitled "Method and Apparatus for Data Capture and Analysis System," Inventor(s) Erik de la Iglesia, et al.
U.S. Appl. No. 13/187,421, filed Jul. 20, 2011, entitled "Query Generation for a Capture System," Inventor(s) Erik de la Iglesia, et al.
U.S. Appl. No. 13/188,441, filed Jul. 21, 2011, entitled "Locational Tagging in a Capture System," Inventor(s) William Deninger et al.
Webopedia, definition of "filter", 2002, p. 1.

Werth, T. et al., "Chapter 1—DAG Mining in Procedural Abstraction," Programming Systems Group; Computer Science Department, University of Erlangen-Nuremberg, Germany.
U.S. Appl. No. 12/360,537, filed Jan. 27, 2009, entitled "Database for a Capture System," Inventor(s) Rick Lowe et al.
International Preliminary Report on Patentability Written Opinion of the International Searching Authority for International Application No. PCT/US2011/024902 dated May 7, 2013 (5 pages).
U.S. Appl. No. 13/896210, filed May 16, 2013, entitled "System and Method for Data Mining and Security Policy Management" Inventor(s) Ratinder Paul Singh Ahuja et al.

* cited by examiner

SYSTEM AND METHOD FOR DATA MINING AND SECURITY POLICY MANAGEMENT

CROSS-REFERENCE TO RELATED APPLICATION

This application is a continuation (and claims the benefit of priority under 35 U.S.C. §120) of U.S. application Ser. No. 12/171,232, filed Jul. 10, 2008, and entitled "SYSTEM AND METHOD FOR DATA MINING AND SECURITY POLICY MANAGEMENT", naming Weimin Liu as inventor. The disclosure of the prior Application is considered part of and is incorporated by reference in the disclosure of this Application.

FIELD OF THE INVENTION

The present invention relates to computer networks, and in particular, to registering documents in a computer network.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices.

FIG. 1 illustrates a simple prior art configuration of a local area network (LAN) 100 connected to the Internet 102. Connected to LAN 100 are various components, such as servers 104, clients 106, and switch 108. Numerous other networking components and computing devices may be connected to the LAN 100. The LAN 100 may be implemented using various wireline (e.g., Ethernet) or wireless technologies (e.g., I19 802.11x). LAN 100 could also be connected to other LANs.

In this prior configuration, LAN 100 is connected to the Internet 102 via a router 110. Router 110 may be used to implement a firewall. Firewalls are used to try to provide users of LANS with secure access to the Internet as well as to provide a separation of a public Web server (e.g., one of the servers 104) from an internal network (e.g., LAN 100). Data leaving LAN 100 and going to the Internet 102 passes through router 110. Router 110 simply forwards packets as is from LAN 100 to the Internet 102.

Once an intruder has gained access to sensitive content inside a LAN such as LAN 100, presently there is no network device that can prevent the electronic transmission of the content from the network (e.g., LAN 100) to outside the network. Similarly, there is no network device that can analyze the data leaving the network in order to monitor for policy violations, and/or make it possible to track down information leaks. What is needed is a comprehensive system to capture, store, and analyze data communicated using the enterprise's network.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the art of computer science to most effectively convey the substance of their work to others skilled in the art. An algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. Keep in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying", etc., refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Networks

Figure 1:
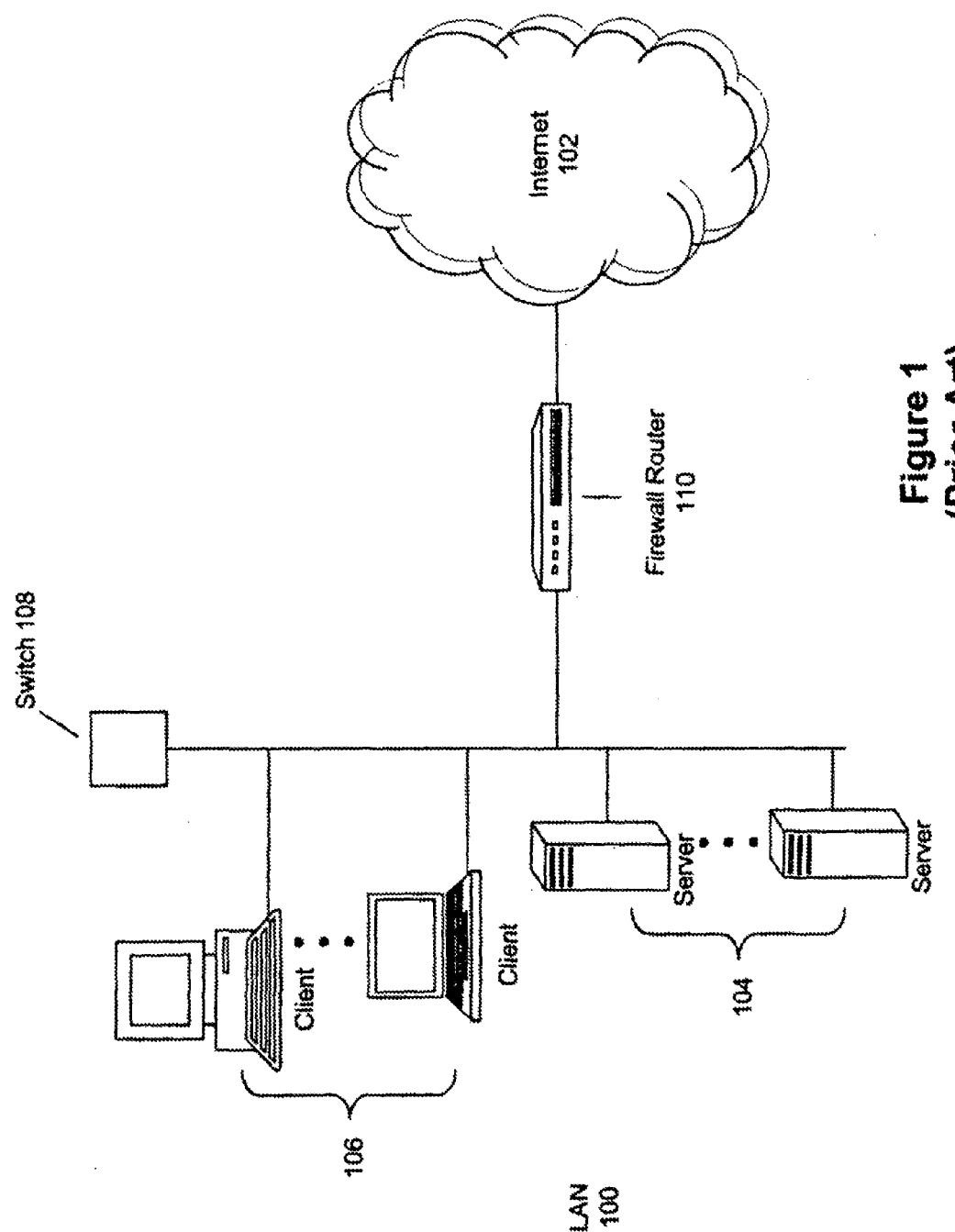
FIG. 1 is a block diagram illustrating a computer network connected to the Internet.

As described earlier with respect to FIG. 1, the router 110 of the prior art simply routes packets to and from a network and the Internet. While the router may log that a transaction has occurred (i.e., packets have been routed), it does not capture, analyze, or store the content contained in the packets.

Figure 2:
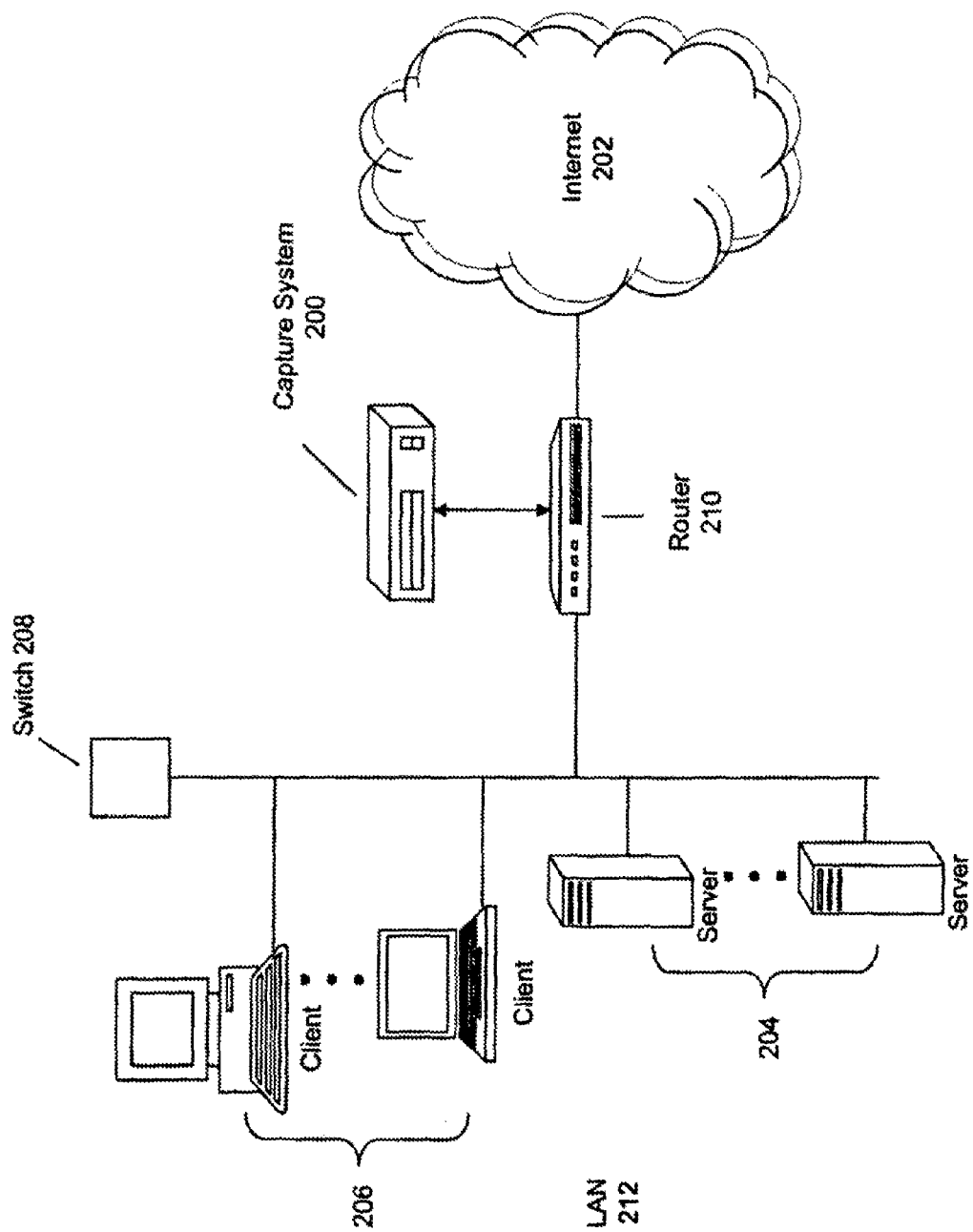
FIG. 2 is a block diagram illustrating one configuration of a capture system according to one embodiment of the present invention.

FIG. 2 illustrates an embodiment of a system utilizing a capture device. In FIG. 2, the router 210 is also connected to a capture system 200 in addition to the Internet 202 and LAN 212. Generally, the router 210 transmits the outgoing data stream to the Internet 202 and a copy of that stream to the capture system 200. The router 210 may also send incoming data to the capture system 200 and LAN 212.

However, other configurations are possible. For example, the capture system 200 may be configured sequentially in front of or behind the router 210. In systems where a router is not used, the capture system 200 is located between the LAN 212 and the Internet 202. In other words, if a router is not used the capture system 200 forwards packets to the Internet 202. In one embodiment, the capture system 200 has a user interface accessible from a LAN-attached device such as a client 206.

The capture system 200 intercepts data leaving a network such as LAN 212. In an embodiment, the capture system also intercepts data being communicated internally to a network such as LAN 212. The capture system 200 reconstructs the documents leaving the network 100 and stores them in a searchable fashion. The capture system 200 is then used to search and sort through all documents that have left the network 100. There are many reasons such documents may be of interest, including network security reasons, intellectual property concerns, corporate governance regulations, and other corporate policy concerns. Exemplary documents include, but are not limited to, Microsoft Office documents (such as Word, Excel, etc.), text files, images (such as JPEG, BMP, GIF, PNG, etc.), Portable Document Format (PDF) files, archive files (such as GZIP, ZIP, TAR, JAR, WAR, RAR, etc.), email messages, email attachments, audio files, video files, source code files, executable files, etc.

Capture System

Figure 3:
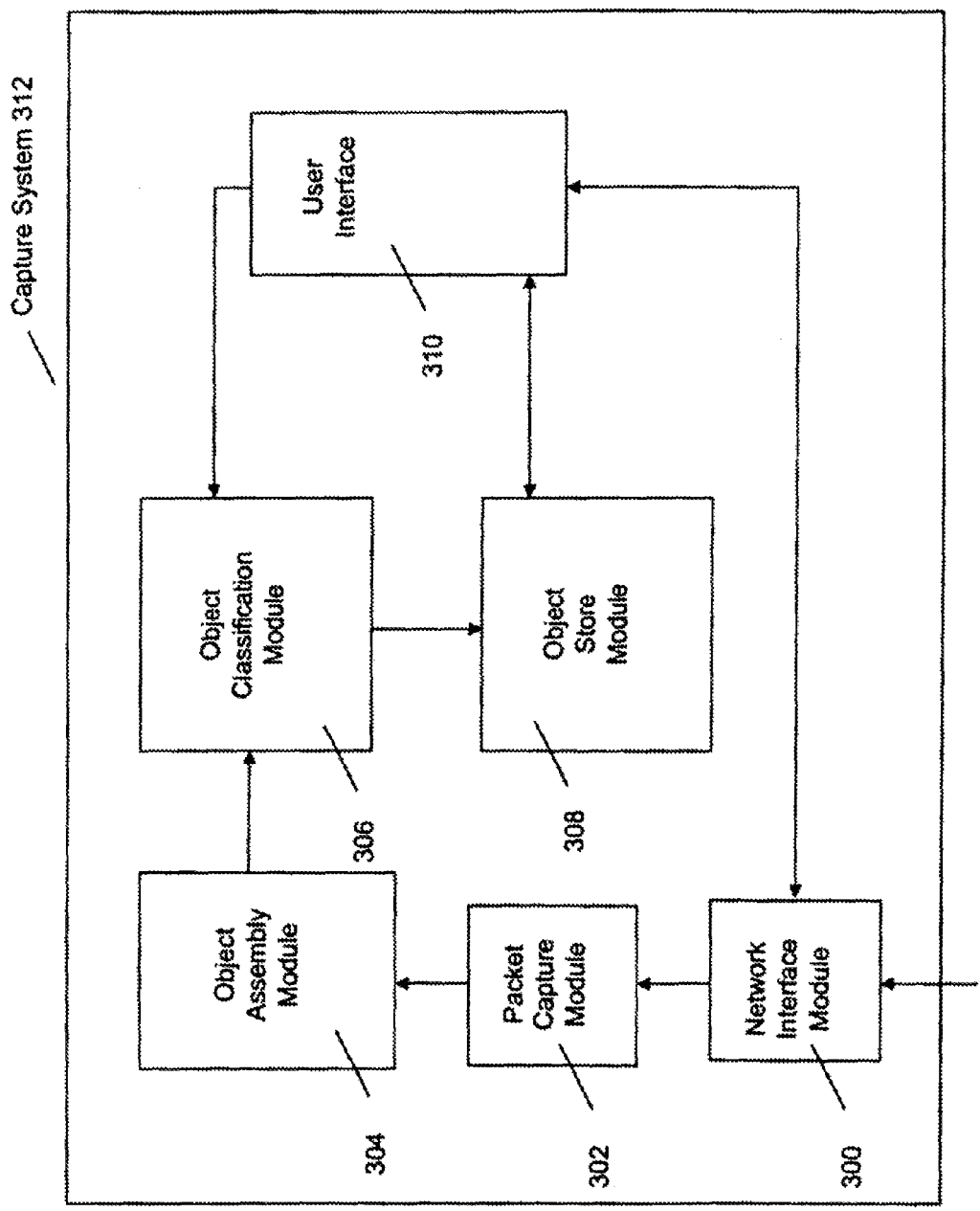
FIG. 3 is a block diagram illustrating the capture system according to one embodiment of the present invention.

FIG. 3 shows an embodiment of a capture system in greater detail. A capture system (such as capture system 200 or 312) may also be referred to as a content analyzer, content/data analysis system, or other similar name. For simplicity, the capture system has been labeled as capture system 300. However, the discussion regarding capture system 300 is equally applicable to capture system 200. A network interface module 300 receives (captures) data, such as data packets, from a network or router. Exemplary network interface modules 300 include network interface cards (NICs) (for example, Ethernet cards). More than one NIC may be present in a capture system.

This captured data is passed from the network interface module 300 to a packet capture module 302 which extracts packets from the captured data. The packet capture module 302 may extract packets from streams with different sources and/or destinations. One such case is asymmetric routing where a packet sent from source "A" to destination "B" travels along a first path and responses sent from destination "B" to source "A" travel along a different path. Accordingly, each path could be a separate "source" for the packet capture module 302 to obtain packets. Additionally, packet data may be extracted from a packet by removing the packet's header and checksum.

When an object is transmitted, such as an email attachment, it is broken down into packets according to various data transfer protocols such as Transmission Control Protocol/Internet Protocol ("TCP/IP"), UDP, HTTP, etc. An object assembly module 304 reconstructs the original or a reasonably equivalent document from the captured packets. For example, a PDF document broken down into packets before being transmitted from a network is reassembled to form the original, or reasonable equivalent of the, PDF from the captured packets associated with the PDF document. A complete data stream is obtained by reconstruction of multiple packets. The process by which a packet is created is beyond the scope of this application.

Figure 4:
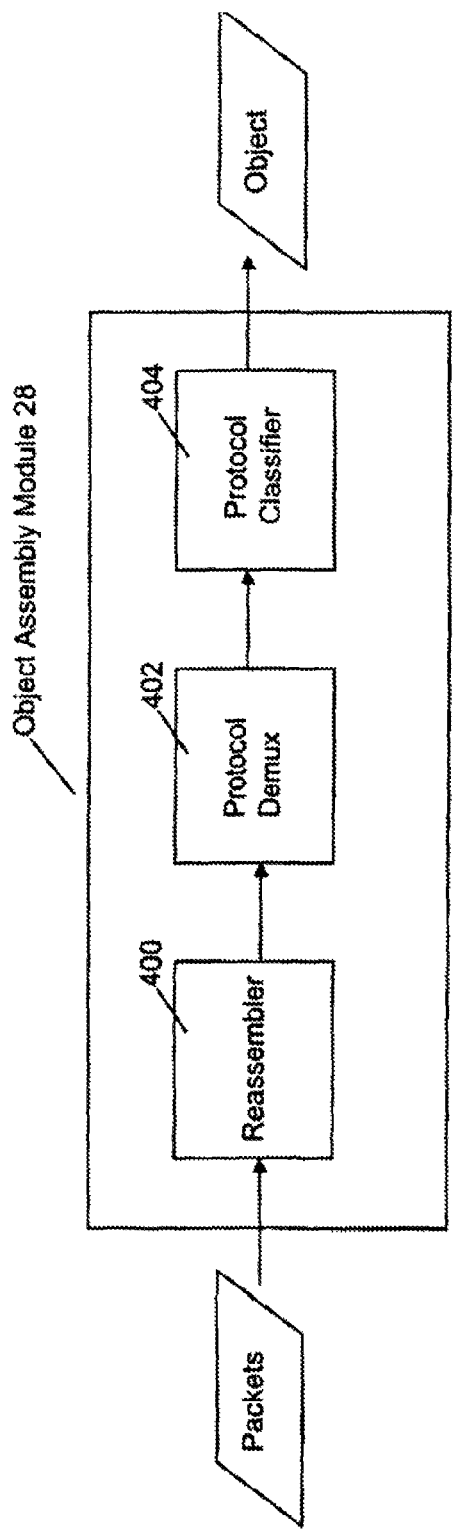
FIG. 4 is a block diagram illustrating an object assembly module according to one embodiment of the present invention.

FIG. 4 illustrates a more detailed embodiment of object assembly module 304. This object assembly module includes a re-assembler 400, protocol demultiplexer ("demux") 402, and a protocol classifier 404. Packets entering the object assembly module 304 are provided to the re-assembler 400. The re-assembler 400 groups (assembles) the packets into at least one unique flow. A TCP/IP flow contains an ordered sequence of packets that may be assembled into a contiguous data stream by the re-assembler 400. An exemplary flow includes packets with an identical source IP and destination IP address and/or identical TCP source and destination ports. In other words, the re-assembler 400 assembles a packet stream (flow) by sender and recipient. Thus, a flow is an ordered data stream of a single communication between a source and a destination. In an embodiment, a state machine is maintained for each TCP connection which ensures that the capture system has a clear picture of content moving across every connection.

The re-assembler 400 begins a new flow upon the observation of a starting packet. This starting packet is normally defined by the data transfer protocol being used. For example, the starting packet of a TCP flow is a "SYN" packet. The flow terminates upon observing a finishing packet (e.g., a "Reset" or "FIN" packet in TCP/IP) or via a timeout mechanism if the finished packing is not observed within a predetermined time constraint.

A flow assembled by the re-assembler 400 is provided to a protocol demultiplexer ("demux") 402. The protocol demux 402 sorts assembled flows using ports, such as TCP and/or UDP ports, by performing speculative classification of the flow's contents based on the association of well known port numbers with specified protocols. For example, because web Hyper Text Transfer Protocol (HTTP) packets, such as, Web traffic packets, are typically associated with TCP port 80, packets that are captured over TCP port 80 are speculatively classified as being HTTP. Examples of other well known ports include TCP port 20 (File Transfer Protocol ("FTP")), TCP port 88 (Kerberos authentication packets), etc. Thus, the protocol demux 402 separates the flows by protocols.

A protocol classifier 404 further sorts flows. The protocol classifier 404 (operating either in parallel or in sequence to the protocol demux 402) applies signature filters to a flow to identify the protocol based solely on the transported data. The protocol classifier 404 uses a protocol's signature(s) (i.e., the characteristic data sequences of a defined protocol) to verify the speculative classification performed by the protocol demux 402. If the protocol classifier 404 determines that the speculative classification is incorrect it overrides it. For example, if an individual or program attempted to masquerade an illicit communication (such as file sharing) using an apparently benign port (for example, TCP port 80), the protocol classifier 404 would use the HTTP protocol signature(s) to verify the speculative classification performed by protocol demux 402.

Protocol classification helps identify suspicious activity over non-standard ports. A protocol state machine is used to determine which protocol is being used in a particular network activity. This determination is made independent of the port or channel on which the protocol is active. As a result, the capture system recognizes a wide range of protocols and applications, including SMTP, FTP, HTTP, P2P, and proprietary protocols in client-server applications. Because protocol classification is performed independent of which port number was used during transmission, the capture system monitors and controls traffic that may be operating over non-standard ports. Non-standard communications may indicate that an enterprise is at risk from spyware, adware, or other malicious code, or that some type of network abuse or insider threat may be occurring.

The object assembly module 304 outputs each flow, organized by protocol, representing the underlying objects being transmitted. These objects are passed to the object classification module 306 (also referred to as the "content classifier") for classification based on content. A classified flow may still contain multiple content objects depending on the protocol used. For example, a single flow using HTTP may contain over 100 objects of any number of content types. To deconstruct the flow, each object contained in the flow is individually extracted and decoded, if necessary, by the object classification module 306.

The object classification module 306 uses the inherent properties and/or signature(s) of various documents to determine the content type of each object. For example, a Word document has a signature that is distinct from a PowerPoint document or an email. The object classification module 306 extracts each object and sorts them according to content type. This classification prevents the transfer of a document whose file extension or other property has been altered. For example, a Word document may have its extension changed from .doc to .dock but the properties and/or signatures of that Word document remain the same and detectable by the object classification module 306. In other words, the object classification module 306 functions beyond simple extension filtering.

According to an embodiment, a capture system uses one or more of six mechanisms for classification: 1) content signature; 2) grammar analysis; 3) statistical analysis; 4) file classification; 5) document biometrics; and 6) concept maps. Content signatures are used to look for predefined byte strings or text and number patterns (i.e., Social Security numbers, medical records, and bank accounts). When a signature is recognized, it becomes part of the classification vector for that content. While beneficial when used in combination with other metrics, signature matching alone may lead to a high number of false positives.

Grammar analysis determines if an object's content is in a specific language and filters accordingly based on this information. Various types of content have their own grammar or syntax. For example, "C" source code uses "if/then" grammar. Legal documents, resumes, and earnings results also have a particular grammar. Grammar analysis also enables an organization to detect the presence of non-English language-based content on their network.

File classification identifies content types regardless of the extensions applied to the file or compression. The file classification mechanism looks for specific file markers instead of relying on normal telltale signs such as .xls or .pdf.

Document biometrics identifies sensitive data even if the data has been modified. Document biometrics recognizes content rich elements in files regardless of the order or combination in which they appear. For example, a sensitive Word document may be identified even if text elements inside the document or the file name itself have been changed. Excerpts of larger files, e.g., a single column exported from an Excel spreadsheet containing Social Security numbers, may also be identified.

Document biometrics takes "snapshots" of protected documents in order to build a signature set for protecting them. In an embodiment, document biometrics distinguishes between public and confidential information within the same document.

Statistical analysis assigns weights to the results of signature, grammar, and biometric analysis. That is, the capture system tracks how many times there was a signature, grammar, or biometric match in a particular document or file. This phase of analysis contributes to the system's overall accuracy.

Concept maps may be used to define and track complex or unique content, whether at rest, in motion, or captured. Concept maps are based on combinations of data classification mechanisms and provide a way to protect content using compound policies. The object classification module 306 may also determine whether each object should be stored or discarded. This determination is based on definable capture rules used by the object classification module 306. For example, a capture rule may indicate that all Web traffic is to be discarded. Another capture rule may indicate that all PowerPoint documents should be stored except for ones originating from the CEO's IP address. Such capture rules are implemented as regular expressions or by other similar means.

Capture rules may be authored by users of a capture system. The capture system may also be made accessible to any network-connected machine through the network interface module 300 and/or user interface 310. In one embodiment, the user interface 310 is a graphical user interface providing the user with easy access to the various features of the capture system 312. For example, the user interface 310 may provide a capture rule authoring tool that allows any capture rule desired to be written. These rules are then applied by the object classification module 306 when determining whether an object should be stored. The user interface 310 may also provide pre-configured capture rules that the user selects from along with an explanation of the operation of such standard included capture rules. Generally, by default, the capture rule(s) implemented by the object classification module 306 captures all objects leaving the network that the capture system is associated with.

Figure 5:
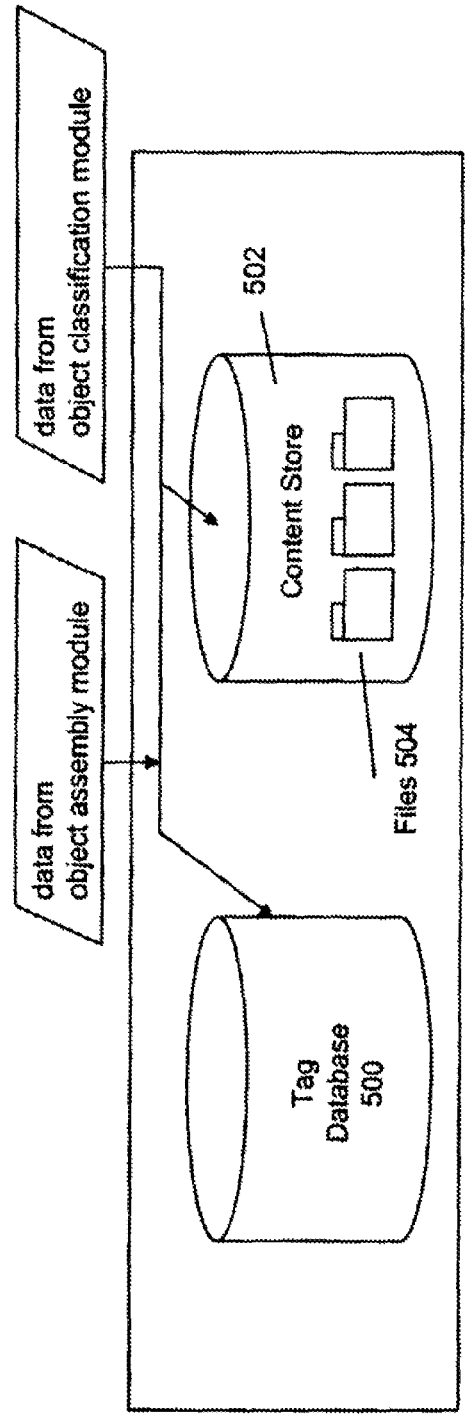
FIG. 5 is a block diagram illustrating an object store module according to one embodiment of the present invention.

If the capture of an object is mandated by one or more capture rules, the object classification module 306 may determine where in the object store module 308 the captured object should be stored. FIG. 5 illustrates an embodiment of object store module 308. Accordingly to this embodiment, the object store includes a tag database 500 and a content store 502. Within the content store 502 are files 504 grouped by content type. For example, if object classification module 306 determines that an object is a Word document that should be stored, it can store it in the file 504 reserved for Word documents. The object store module 506 may be internal to a capture system or external (entirely or in part) using, for example, some network storage technique such as network attached storage (NAS), storage area network (SAN), or other database.

In an embodiment, the content store 502 is a canonical storage location that is simply a place to deposit the captured objects. The indexing of the objects stored in the content store 502 is accomplished using a tag database 500. The tag database 500 is a database data structure in which each record is a "tag" that indexes an object in the content store 502 and contains relevant information about the stored object. An example of a tag record in the tag database 500 that indexes an object stored in the content store 502 is set forth in Table 1:

TABLE 1

| Field Name | Definition (Relevant Information) |
|---|---|
| MAC Address | NIC MAC address |
| Source IP | Source IP address of object |
| Destination IP | Destination IP address of object |
| Source Port | Source port number of object |
| Destination Port | Destination port number of the object |
| Protocol | Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (possibly rule author) |
| Configuration | Capture rule directing the capture of object |
| Signature | Hash signature of object |
| Tag Signature | Hash signature of all preceding tag fields |

There are various other possible tag fields and some tag fields listed in Table 1 may not be used. In an embodiment, the tag database 500 is not implemented as a database and another data structure is used.

The mapping of tags to objects may be obtained by using unique combinations of tag fields to construct an object's name. For example, one such possible combination is an ordered list of the source IP, destination IP, source port, destination port, instance, and timestamp. Many other such combinations including both shorter and longer names are possible. A tag may contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
|---|---|
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |

TABLE 2-continued

| Field Name | Definition |
|---|---|
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of the capture system 22. Only the capture system 22 knows its own private key, thus, the integrity of the stored object can be verified by comparing a hash of the stored object to the signature decrypted with the public key of the capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

When a user searches over the objects captured by the capture system 22, it is desirable to make the search as fast as possible. One way to speed up searches is to perform searches over the tag database instead of the content store, since the content store will generally be stored on disk and is far more costly both in terms of time and processing power to search then a database.

The objects and tags stored in the object store module 308 may be interactively queried by a user via the user interface 310. In one embodiment, the user interface interacts with a web server (not shown) to provide the user with Web-based access to the capture system 312. The objects in the object store module 308 are searchable for specific textual or graphical content using exact matches, patterns, keywords, and/or various other attributes.

For example, the user interface 310 may provide a query-authoring tool (not shown) to enable users to create complex searches of the object store module 308. These search queries are provided to a data mining engine (not shown) that parses the queries to the object store module. For example, tag database 500 may be scanned and the associated object retrieved from the content store 502. Objects that matched the specific search criteria in the user authored query are counted and/or displayed to the user by the user interface 310.

Searches may be scheduled to occur at specific times or at regular intervals. The user interface 310 may provide access to a scheduler (not shown) that periodically executes specific queries. Reports containing the results of these searches are made available to the user at runtime or at a later time such as generating an alarm in the form of an e-mail message, page, system log, and/or other notification format.

A user query for a pattern is generally in the form of a regular expression. A regular expression is a string that describes or matches a set of strings, according to certain syntax rules. There are various well-known syntax rules such as the POSIX standard regular expressions and the PERL scripting language regular expressions. Regular expressions are used by many text editors and utilities to search and manipulate bodies of text based on certain patterns. Regular expressions are well-known in the art. For example, according to one syntax (Unix), the regular expression 4\d{15} means the digit "4" followed by any fifteen digits in a row. This user query would return all objects containing such a pattern.

Certain useful search categories cannot be defined well by a single regular expression. As an example, a user may want to query all emails containing a credit card number. Various credit card companies used different numbering patterns and conventions. A card number for each company can be represented by a regular expression. However, the concept of credit card number can be represented by a union of all such regular expressions.

For such categories, the concept of attribute is herein defined. An attribute, in one embodiment, represents a group of one or more regular expressions (or other such patterns). The term "attribute" is merely descriptive, such concept could just as easily be termed "category," "regular expression list," or any other descriptive term.

Generally, a capture system has been described above as a stand-alone device. However, capture systems may be implemented on any appliance capable of capturing and analyzing data from a network. For example, the capture system 310 described above could be implemented on one or more of the servers or clients shown in FIG. 1. Additionally, a capture system may interface with a network in any number of ways including, but not limited to, wirelessly.

Document Registration

The capture system described above implements a document registration scheme. A user registers a document with a capture system, the system then alerts the user if all or part of the content in the registered document is attempting to, or leaving, the network. Thus, unauthorized documents of various formats (e.g., Microsoft Word, Excel, PowerPoint, source code of any kind, and text are prevented) are prevented from leaving an enterprise. There are great benefits to any enterprise that keeps its intellectual property, and other critical, confidential, or otherwise private and proprietary content from being mishandled. Sensitive documents are typically registered with the capture system 200, although registration may be implemented using a separate device.

Figure 6:
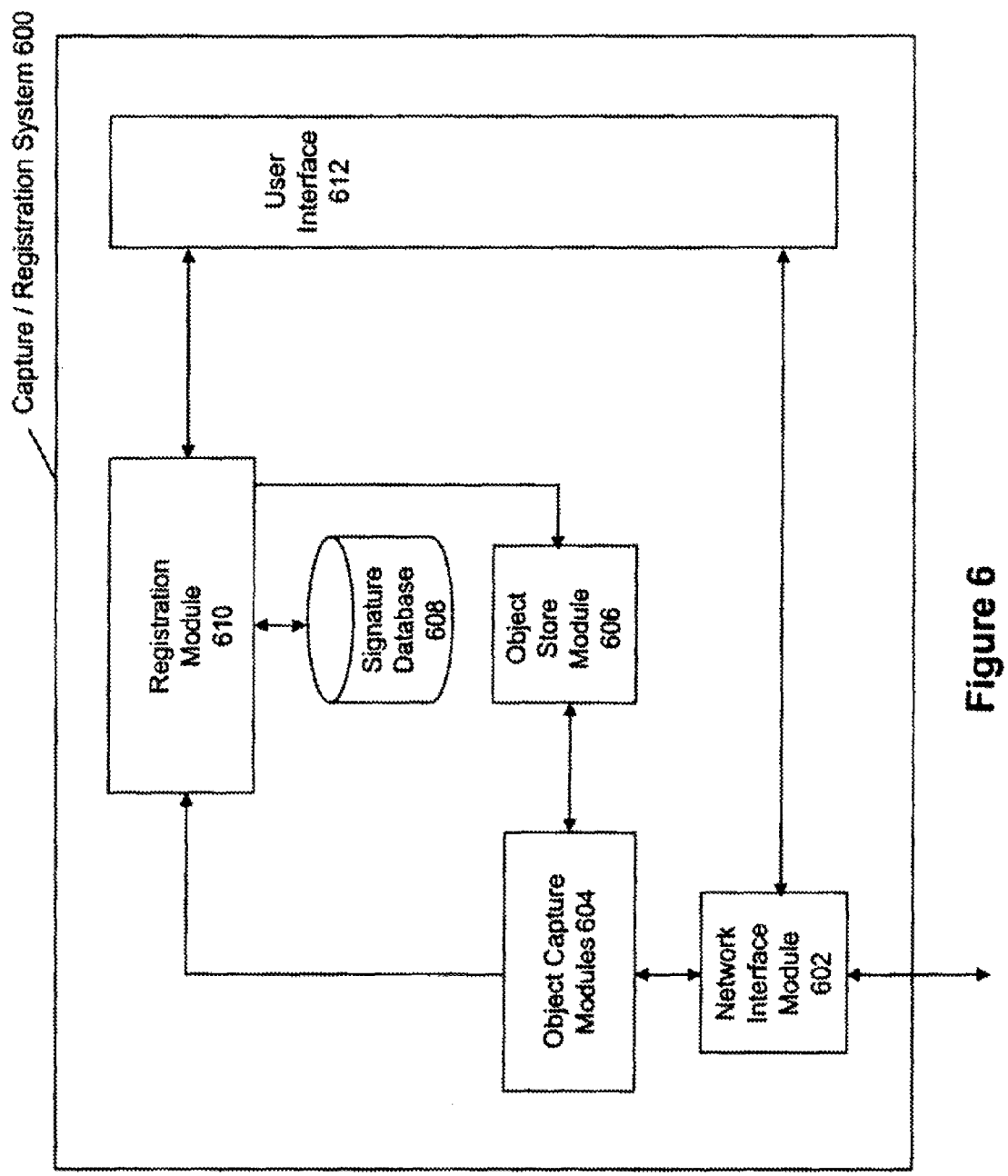
FIG. 6 is a block diagram illustrating a document registration system according to one embodiment of the present invention.

FIG. 6 illustrates an embodiment of a capture/registration system. The capture/registration system 600 has components which are used in a similar or identical way to those of the capture system 300 shown in FIG. 3, including the network interface module 602, the object store module 606, user interface 612, and object capture modules 604 (the packet capture 302, object assembly 304, and object classification 306 modules of FIG. 3).

The capture/registration system 600 includes a registration module 610 interacting with a signature storage 608 (such as a database) to help facilitate a registration scheme. There are numerous ways to register documents. For example, a document may be electronically mailed (e-mailed), uploaded to the registration system 600 (for example through the network interface module 702 or through removable media), the registration system 600 scanning a file server (registration server) for documents to be registered, etc. The registration process may be integrated with an enterprise's document management systems. Document registration may also be automated and transparent based on registration rules, such as "register all documents," "register all documents by specific author or IP address," etc.

After being received, classified, etc., a document to be registered is passed to the registration module 610. The registration module 610 calculates a signature or a set of signatures of the document. A signature associated with a document may be calculated in various ways. An exemplary signature consists of hashes over various portions of the document, such as selected or all pages, paragraphs, tables and sentences. Other possible signatures include, but are not limited to, hashes over embedded content, indices, headers, footers, formatting information, or font utilization. A signature may also include computations and meta-data other than hashes, such as word Relative Frequency Methods (RFM)—Statistical, Karp-Rabin Greedy-String-Tiling-Transposition, vector space models, diagrammatic structure analysis, etc.

The signature or set of signatures associated on a document is stored in the signature storage 608. The signature storage 608 may be implemented as a database or other appropriate data structure as described earlier. In an embodiment, the signature storage 608 is external to the capture system 600.

Registered documents are stored as objects in the object store module 606 according to the rules set for the system. In an embodiment, only documents are stored in the content store 606 of the object system network. These documents have no associated tag since many tag fields do not apply to registered documents.

As set forth above, the object capture modules 602 extract objects leaving the network and store various objects based on capture rules. In an embodiment, all extracted objects (whether subject to a capture rule or not) are also passed to the registration module for a determination whether each object is, or includes part of, a registered document.

The registration module 610 calculates the set of one or more signatures of an object received from the object capture modules 604 in the same manner as the calculation of the set of one or more signatures of a document received from the user interface 612 to be registered. This set of signatures is then compared against all signatures in the signature database 608. However, parts of the signature database may be excluded from a search to decrease the amount comparisons to be performed.

A possible unauthorized transmission is detectable if any one or more signatures in the set of signatures of an extracted object matches one or more signatures in the signature database 608 associated with a registered document. Detection tolerances are usually configurable. For example, the system may be configured so that at least two signatures must match before a document is deemed unauthorized. Additionally, special rules may be implemented that make a transmission authorized (for example, if the source address is authorized to transmit any documents off the network).

Figure 7:
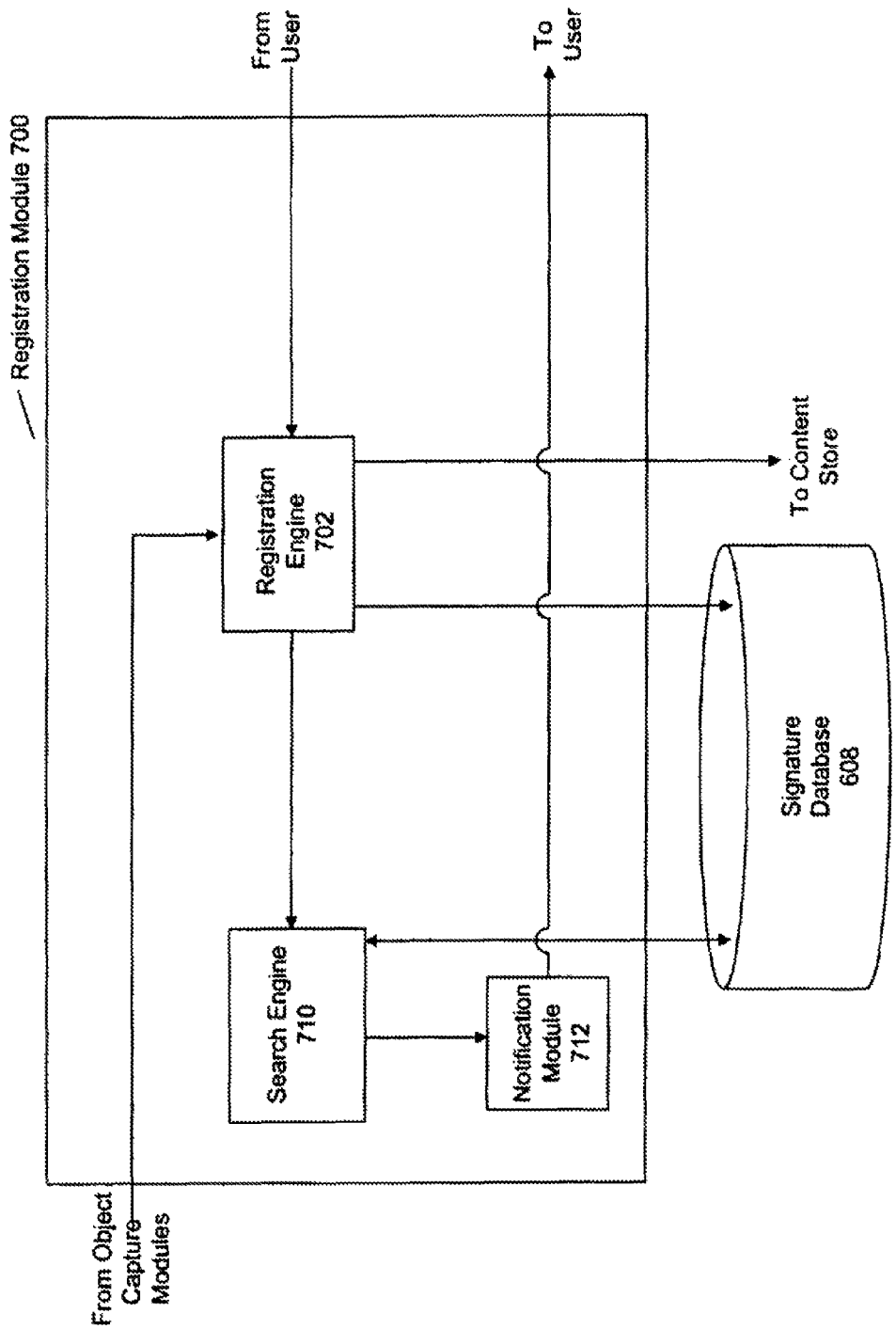
FIG. 7 is a block diagram illustrating registration module according to one embodiment of the present invention.

An embodiment of a registration module is illustrated in FIG. 7. As discussed above, a user may select a document to be registered. The registration engine 702 generates signatures for the document and forwards the document to content storage and the generated signatures to the signature database 608. Generated signatures are associated with a document, for example, by including a pointer to the document or to some attribute to identify the document.

The registration engine calculates signatures for a captured object and forwards them to the search engine 710. The search engine 710 queries the signature database 608 to compare the signatures of a captured object to the document signatures stored in the signature database 608. Assuming for the purposes of illustration, that the captured object is a Word document that contains a pasted paragraph from registered PowerPoint document, at least one signature of the registered PowerPoint signatures will match a signature of the captured Word document. This type of event is referred to as the detection of an unauthorized transfer, a registered content transfer, or other similarly descriptive term.

When a registered content transfer is detected, the transmission may be halted or allowed with or without warning to the sender. In the event of a detected registered content transfer, the search engine 710 may activate the notification module 712, which sends an alert to the registered document owner. The notification module 712 may send different alerts (including different user options) based on the user preference associated with the registration and the capabilities of the registration system.

An alert indicates that an attempt (successful or unsuccessful) to transfer a registered content off the network has been made. Additionally, an alert may provide information regarding the transfer, such as source IP, destination IP, any other information contained in the tag of the captured object, or some other derived information, such as the name of the person who transferred the document off the network. Alerts are provided to one or more users via e-mail, instant message (IM), page, etc. based on the registration parameters. For example, if the registration parameters dictate that an alert is only to be sent to the entity or user who requested registration of a document then no other entity or user will receive an alert.

If the delivery of a captured object is halted (the transfer is not completed), the user who registered the document may need to provide consent to allow the transfer to complete. Accordingly, an alert may contain some or all of the information described above and additionally contain a selection mechanism, such as one or two buttons—to allow the user to indicate whether the transfer of the captured object is eligible for completing. If the user elects to allow the transfer, (for example, because he is aware that someone is emailing a part of a registered document (such as a boss asking his secretary to send an email), the transfer is executed and the captured object is allowed to leave the network.

If the user disallows the transfer, the captured object is not allowed off of the network and delivery is permanently halted. Several halting techniques may be used such as having the registration system proxy the connection between the network and the outside, using a black hole technique (discarding the packets without notice if the transfer is disallowed), a poison technique (inserting additional packets onto the network to cause the sender's connection to fail), etc.

Figure 8:
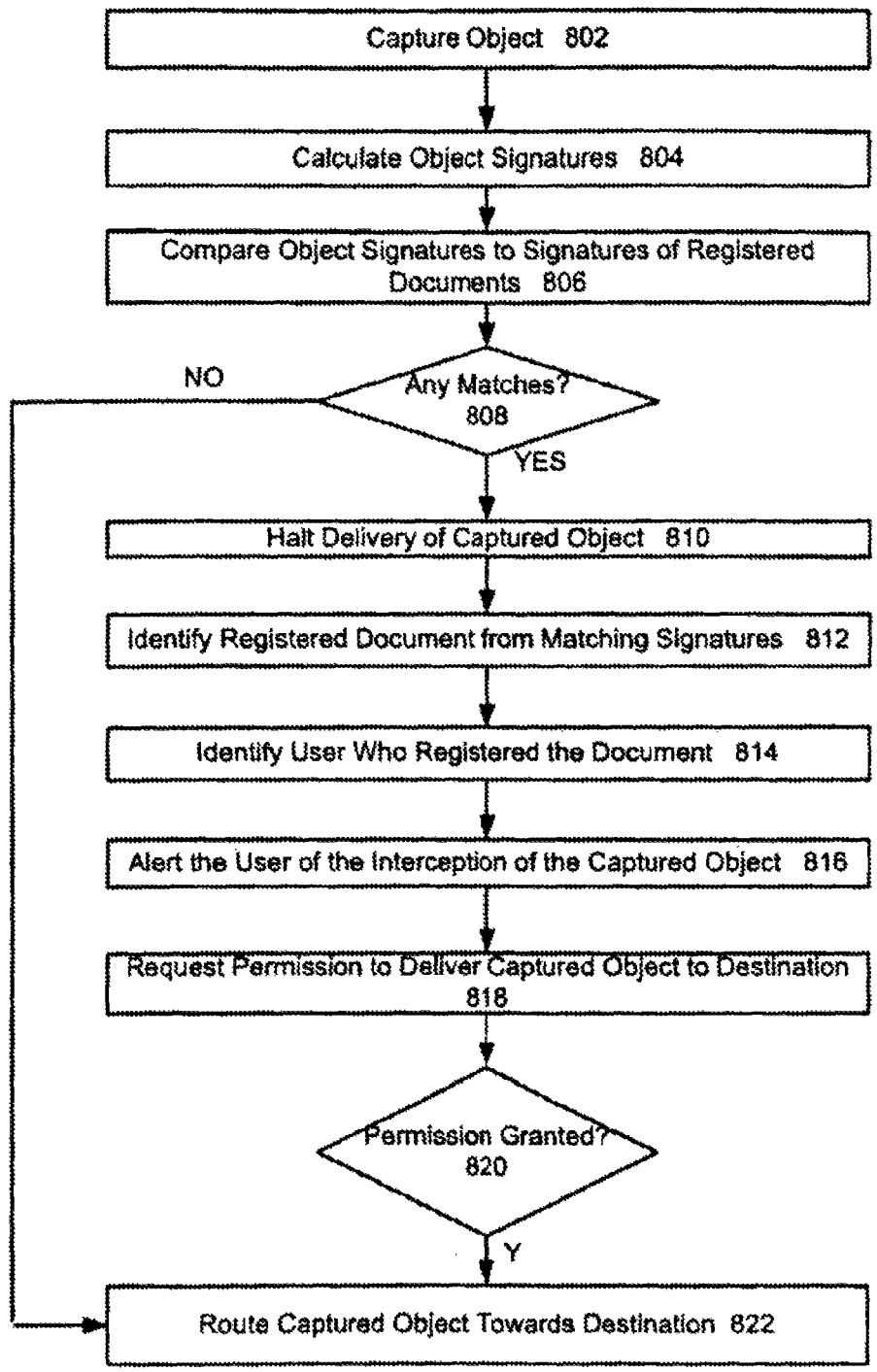
FIG. 8 illustrates an embodiment of the flow of the operation of a registration module.

FIG. 8 illustrates an embodiment of the flow of the operation of a registration module. An object is captured at 802. This object was sent from an internal network source and designated for delivery inside and/or outside of the network.

A signature or signatures are generated for this captured object at 804. This signature or signatures are generated in a manner as described earlier. The signatures of the captured document are compared to the signatures of registered documents at 806. For example, the search engine 710 queries the signature database which houses the signatures for registers documents and compares these registered document signatures to the signatures generated for the captured document.

If there are no matches at 808, then the captured object is routed toward its destination at 822. This routing is allowed to take place because the captured object has been deemed to not contain any material that has been registered with the system as warranting protection. If there is a match at 808, further processing is needed.

In an embodiment, the delivery of the captured object is halted at 810. Halting delivery prevents any questionable objects from leaving the network. Regardless if the delivery is halted or not, the registered document that has signatures that match the captured object's signatures is identified at 812. Furthermore, the identity of the user or entity that registered the document is ascertained at 814.

The user or entity of the matching registered document is alerted to this attempt to transmit registered material at 816. This alert may be sent to the registered user or entity in real-time, be a part of a log to be checked, or be sent to the registered user or entity at a later point in time. In an embodiment, an alert is sent to the party attempting to transmit the captured object that the captured object contains registered information.

A request to allow delivery of the captured object may be made to the registered user or entity at 818. As described earlier, there are situations in which a captured object that contains registered material should be allowed to be delivered. If the permission is granted at 820, the captured object is routed toward its destination at 822. If permission is not granted, the captured object is not allowed to leave the network.

Signature Generation

There are various methods and processes by which the signatures are generated, for example, in the registration engine 702 in FIG. 7.

Figure 9:
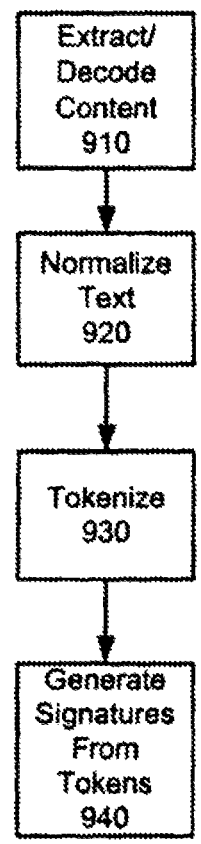
FIG. 9 is a flow diagram illustrating an embodiment of a flow to generate signatures.

One embodiment of a flow to generate signatures is illustrated in FIG. 9. The content of a document (register or intercepted) is extracted and/or decoded depending on the type of content contained in the document at 910. The content is extracted by removing the "encapsulation" of the document. For example, if the document is a Microsoft Word file, then the textual content of the file is extracted and the specific MS Word formatting is removed. If the document is a PDF file, the content has to be additionally decoded, as the PDF format utilizes a content encoding scheme.

To perform the text extraction/decoding at 910, the content type of the document is detected (for example, from the tag associated with the document). Then, the proper extractor/decoder is selected based on the content type. An extractor and/or decoder used for each content type extracts and/or decodes the content of the document as required. Several off the shelf products are available, such as the PDFtoText software, may be used for this purpose. In one embodiment, a unique extractor and/or decoder is used for each possible content type. In another embodiment, a more generic extractor and/or decoder is utilized.

The text content resulting from the extraction/decoding is normalized at 920. Normalization includes removing excess delimiters from the text. Delimiters are characters used to separate text, such as a space, a comma, a semicolon, a slash, tab, etc. For example, the extracted text version of an Microsoft Excel spreadsheet may have two slashes between all table entries and the normalized text may have only one slash between each table entry or it may have one space between each table entry and one space between the words and numbers of the text extracted from each entry.

Normalization may also include delimiting items in an intelligent manner. For example, while credit card numbers generally have spaces between them they are a single item. Similarly, e-mail addresses that look like several words are a single item in the normalized text content. Strings and text identified as irrelevant can be discarded as part of the normalization procedure.

In one embodiment, such evaluations are made by comparison to a pattern. For example, a pattern for a social security number may be XXX-XX-XXXX, XXXXXXXXX, or XXX XX XXXX, where each X is a digit from 0-9. An exemplary pattern for an email address is word@word.three-letter-word. Similarly, irrelevant (non-unique) stings, such as copyright notices, can have associated patterns.

The pattern comparison is prioritized in one embodiment. For example, if an email address is considered more restrictive than a proper name and a particular string could be either an email address or a proper name, the string is first tested as a possible email address. A string matching the email pattern is classified as an email address and normalized as such. If, however, it is determined that the string is not an email address, then the string is tested against the proper name pattern (for example, a combination of known names). If this produces a match, then the string is normalized as a proper name. Otherwise the string is normalized as any other normal word.

By comparing the normalization patterns against the string to be normalized in sequence, an implicit pattern hierarchy is established. In one embodiment, the hierarchy is organized such that the more restrictive, or unique, a pattern is, the higher its priority. In other words, the more restrictive the pattern, the earlier it is compared with the string. Any number of normalization patterns useable and the list of patterns may be configurable to account for the needs of a particular enterprise.

Normalization may also include discarding text that is irrelevant for signature generation purposes. For example, text that is known not to be unique to the document may be considered irrelevant. The copyright notice that begins a source code document, such as a C++ source file, is generally not relevant for signature generation, since every source code document of the enterprise has the identical textual notice and would be ignored. Irrelevant text is identified based on matching an enumerated list of known irrelevant text or by keeping count of certain text and thus identifying frequently reoccurring strings (such as strings occurring above a certain threshold rate) as non-unique and thus irrelevant. Other processes to identify irrelevant text include, but are not limited to, identification through pattern matching, identification by matching against a template, and heuristic methods requiring parsing of examples of other documents of the same type.

The delimited text items of the normalized text content are tokenized, and, converted into a list of tokens at 930. In one embodiment, tokenizing involves only listing the delimited items. In another embodiment, each item is converted to a token of fixed size. Text items may be hashed into a fixed or configurable hash site such as binary number (for example, an 8-bit token). An exemplary hash function that may be used for tokenizing is MD5.

The document signatures are generated from the list of tokens at 940. An exemplary embodiment of a flow for changing tokens into document signatures is described with reference to FIG. 10. The first M tokens from a list of tokens generated from a document are selected at 1010, where M is an appropriate positive integer value. For example, if M is 10, then the first ten tokens from a list are selected.

Of the selected M tokens, N special tokens are selected at 1020, N also being an appropriate positive integer and is less than, or equal to, M. The N special tokens may be selected at random, in part based on size, and/or in part on obscurity. Tokens that occur less frequently are more obscure and thus more likely to be selected as a special token. A token dictionary may be provided to log the frequency of tokens.

The special tokens may also be selected based on the type of the token as defined by the normalization pattern matched by the source string. As set forth above, during the normalization process, some strings are identified as higher priority text (such as email addresses, credit card numbers, etc.) the tokenization of which results in higher priority tokens. Thus, the selection of the N special tokens may take the source string into account.

Tokens may also have an associated priority value that may be used in selecting the special tokens. The priority value can be based on the priority of the normalization pattern matched by the token (for example, social security number, credit card number, email address, etc.) or based on additional signs of uniqueness, such as the frequency of capitalized letters, the inclusion of special rare characters (for example, "^", "*" "@" etc.)

A hash signature of the N special tokens is calculated, resulting in one of the document signatures at 1020. The hash is calculable in a number or ways. Special tokens may be hashed individually, or in groups, and the resultant hashes concatenated to form a signature, concatenated prior to the calculation, or hashed without concatenation at all. Any appropriate hash function and/or any combination of these hashing techniques may be utilized.

In one embodiment, before the next M tokens are selected, P tokens of the list of tokens are skipped from the first token of the M tokens. However, if P is zero, the next M tokens would be identical to the current M tokens, and therefore zero is not an allowed value for P. If P is less than M, then the next set of M tokens will overlap with the current set of M tokens. If P is equal to M, then the first token of the next M tokens will immediately follow the last token of the current M tokens. If P is greater than M, then some tokens are skipped between the next and the current M tokens.

A determination is made as to whether all signatures have been generated at 1040. This is be done by observing if there are less than M tokens remaining on the list, hence, the next M tokens cannot be selected. If all signatures for the document have been generated, then the process terminates. However, if more signatures are to be generated for the document the next M tokens are selected by reverting to selecting tokens at 1010.

Figure 10:
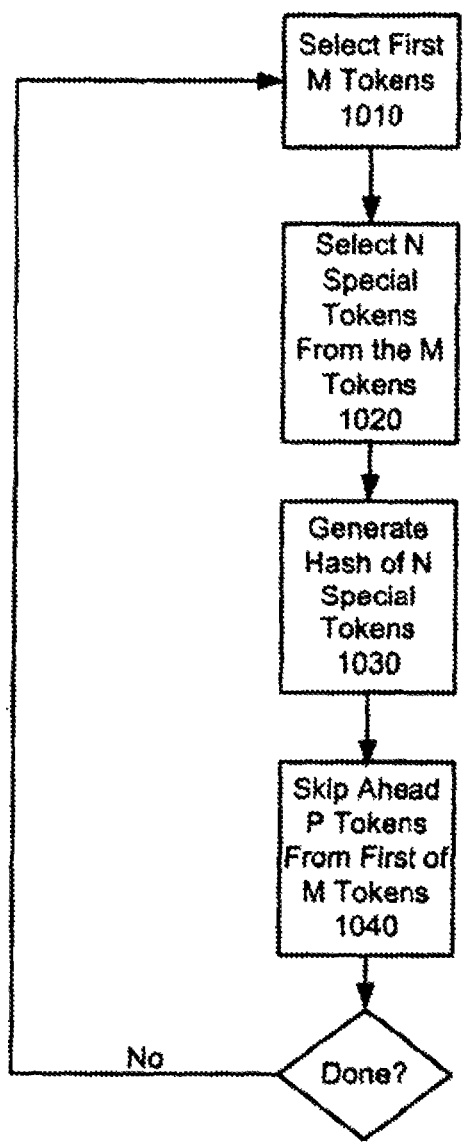
FIG. 10 is a flow diagram illustrating an embodiment of changing tokens into document signatures.

There are numerous other ways to perform each of the proceedings of FIGS. 9 and 10. Some blocks are skipped entirely in some embodiments. For example, block 930 in FIG. 9 may be skipped and the signatures generated directly from the normalized text. Regarding FIG. 10, various values may be used for M, N, and P, with each combination generating a different number of signatures. The specific configuration of M, N, and P thus depends on the needs of the enterprise and the volume and content of captured and registered documents. In an embodiment, M ranges between 8-20, N between 8-10, and P between 4-40.

Figure 11:
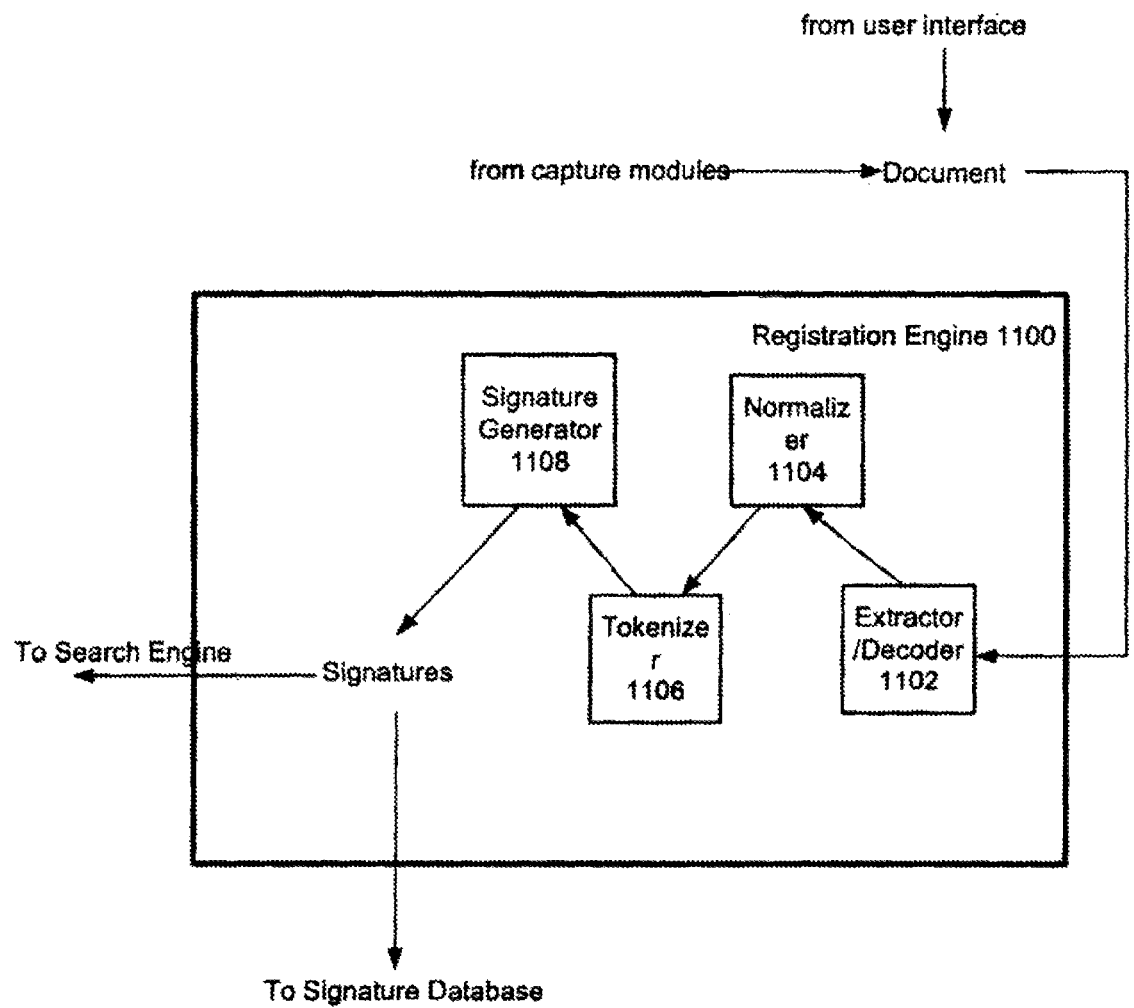
FIG. 11 illustrates an embodiment of a registration engine that generates signatures for documents.

An embodiment, of a registration engine that generates signatures for documents is illustrated in FIG. 11. The registration engine 1100 accepts documents, and generates signatures over these documents. The document may be one registered via the user interface, or one captured by the capture modules, as described earlier.

The registration engine 1100 includes an extractor/decoder 1102 to perform the functionality described with reference to block 910 of FIG. 9. The registration engine also includes a normalizer 1104 to perform the functionality described with reference to block 920 of FIG. 9. A tokenizer 1106 performs the functionality described with reference to 930 of FIG. 9. A signature generator 1108 performs the functionality described with reference to block 940 of FIG. 9. The signature 1100 generator may implement the process described with reference to FIG. 10.

Indexing

Searching for information about captured objects stored on a disk (either local or networked) is generally slow as each object must first be retrieved from the disk and then examined against the search criteria. As described below, by creating one or more fast storage (such as Random Access Memory, flash, processor cache, etc.) indexes containing information (such as metadata information and/or keywords) about the objects (and therefore the content) stored on a disk, the task of searching for information regarding captured objects is performed quicker.

Figure 12:
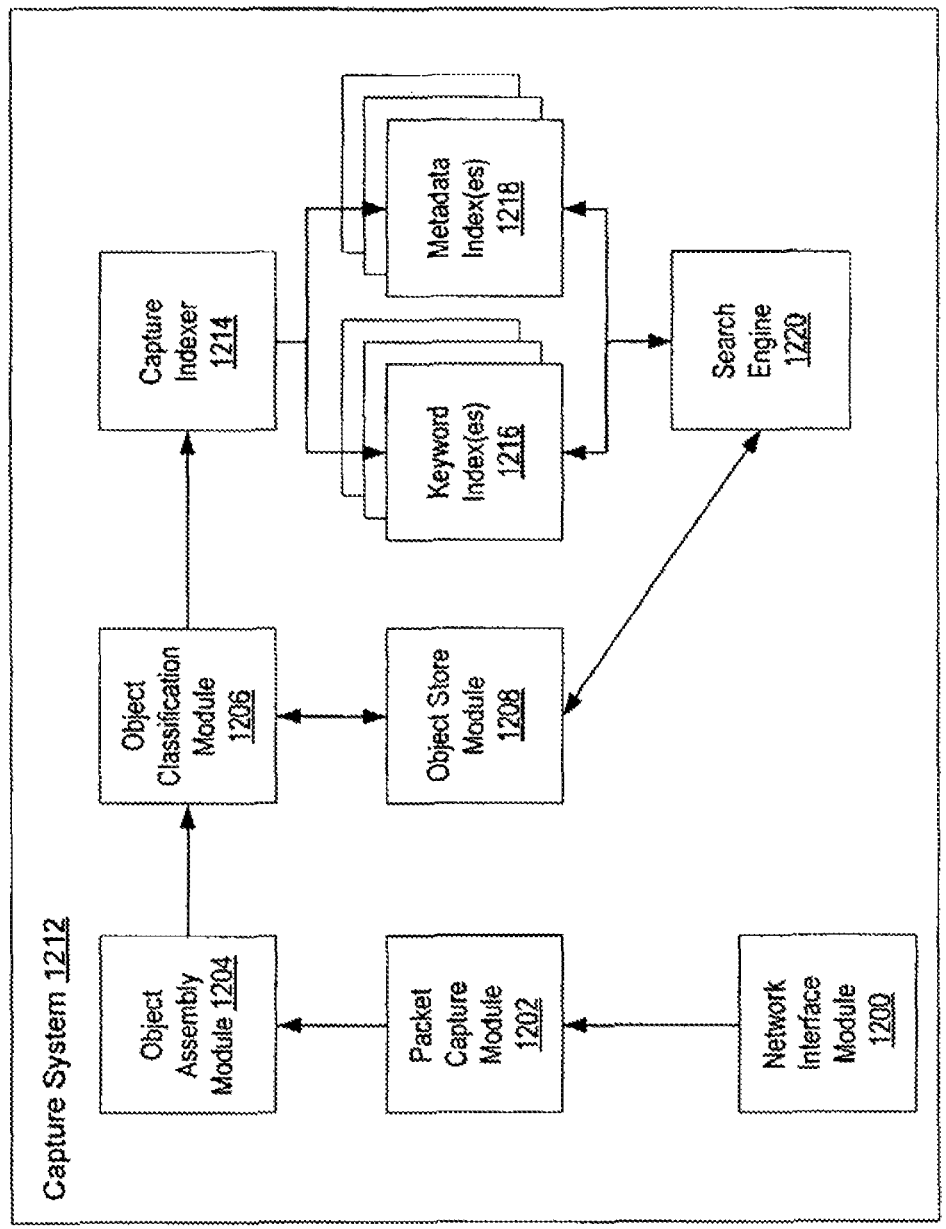
FIG. 12 illustrates an exemplary embodiment of a network capture device.

FIG. 12 illustrates an exemplary embodiment of a network capture device utilizing indexing. The indexing network capture device 1212 includes a network interface module 1200, packet capture module 1202, object assembly module 1204, object classification module 1206, and an object store module 1208. These modules operate in a manner consistent with those modules described earlier (for example, in FIG. 3). During typical operation, the indexing network capture device 1212 captures and analyzes packet streams as described earlier.

The indexing network capture device 1212 also includes a capture indexer 1214 to create entries into word indexes 1216 consisting of a dictionary (or lists) of keywords found in all captured content (flows, documents, etc.) and/or entries into metadata indexes (or lists) 1218 based on captured content. In an embodiment, the capture indexer 1214 is a part of the object classification module 1206. Keyword entries may point to a data structure containing the objects containing the keyword and/or point to a list of objects containing the keyword. A keyword is a word, phrase, name, or other alphanumeric term that exists within common textual content such as an email, Microsoft Office document, or similar content. Typically, only currently used indexes are stored in cache or RAM on the capture device, however, one or more of these indexes may also be stored on disk either locally or remotely.

The persistence of these indexes to disk may be done on command or periodically. However, searching is faster if more indexes that are in RAM or other fast storage device rather than on disk.

A metadata index is a tree structure for an individual property (such as IP address) and a subsequent list of captured objects in capture storage device that have said property (such as "transmitted from the specific IP addresses"). Metadata includes properties describing the network characteristics of the content containing keywords. Examples of network characteristics include, but are not limited to, the source and destination addresses (Internet Protocol (IP) addresses), time and date of the transmission, size and name of the content, and protocol used to transmit the content. Additional descriptive properties may be used to describe the device upon which the content was captured, the user, viewer of the captured content or security settings of the captured content, etc. Much of this information is also found in tags as described earlier.

While the keyword index(es) 1216 and metadata index(es) 1218 are illustrated as a being separate entities, they may be a part of a single file per time period.

Because of the two index system, textual and numeric properties may be indexed using different indexing algorithms (for example, a keyword index may be a hash list and a metadata index a B-tree, etc.). Furthermore, metadata indexes that represent properties that may be enumerated (that have a limited number of possible values) may use different algorithms than those with unbounded properties. An example of an enumerated property is "protocol," as there are a limited and known number of protocols that are supported by a network capture device. An example of an unbounded property is "size," as an infinite number of possible sizes exist for the content that will be captured by a network capture device.

The capture indexer utilizes adaptive time-based dictionary granularity and creates new indexes over time, and therefore should prevent any specific index from growing unbounded. Accordingly, a specific maximum search time to find an arbitrary element in a tree or hash list is maintained. The temporal basis for creating a new index is determined by a plurality of factors including, but not limited to: a) the number of keywords or metadata elements that have been inserted into the index; b) the number of captured objects listed in the index; c) the aggregate size of the index; and d) the aggregate size of captured content being indexed. In an embodiment, the creation of new indices is additionally controlled by a user or administrator employing different heuristics to optimize search performance.

A search engine 1220 searches the indexes and returns a list of captured documents from capture storage device 1208 that match a specified search criteria. This search (or query) searches for each criteria component individually to retrieve a list of tags associated with objects in capture storage device 1208 for each criteria and then selects only those tags associated with objects that exist within all returned lists. Alternatively, selections may be made based on a captured object not existing within a returned list. An example of such a selection is the evaluation of the criteria "contains keyword confidential but not keyword sample." In this case, only objects that exist within the first returned list (contains "confidential") but not within the second returned list (contains "sample") would be qualified as a result of the search.

While search engine 1220 is illustrated as a component inside of the capture device 1212, it may exist on an external system. Additionally, the search engine 1220 may also have capabilities similar to those of the earlier described search engine. Similarly, a capture/registration system, as described before, may also utilize a capture indexer, indexes, and search engine.

Figure 13:
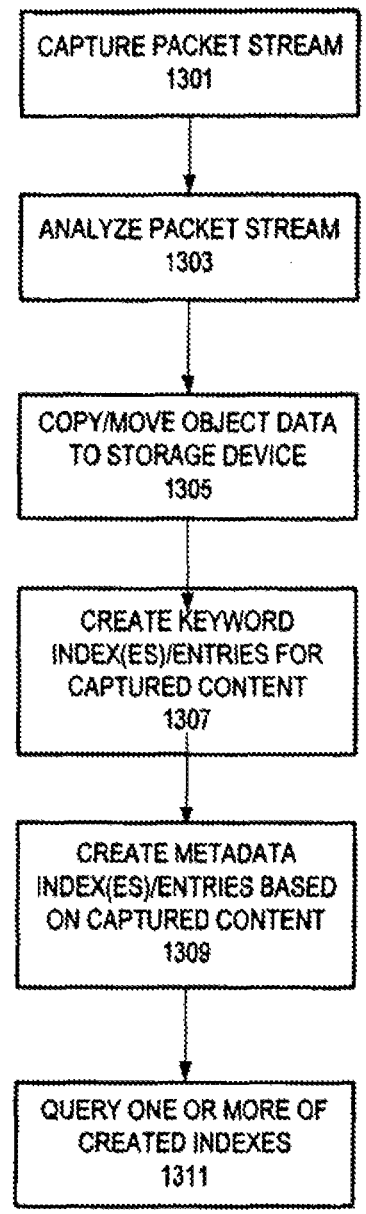
FIG. 13 illustrates an exemplary indexing and searching flow.

FIG. 13 illustrates an exemplary indexing and searching flow. At 1301, a packet stream is captured. This packet stream is analyzed at 1303 and a copy of the object and/or object data is moved to a storage device at 1305. The capturing and analyzing of packet streams and moving objects and/or object data has been previously described.

Keyword index entries for the captured content are created at 1309. This entry creation is performed by the capture indexer or equivalent. A keyword index may also be created, as necessary, at this point.

Metadata index entries for the captured content are created at 1311. This entry creation is performed by the capture indexer or equivalent. A metadata index may also be created, as necessary, at this point.

Finally, one or more of the indexes (metadata or keyword) is queried to find a particular object in storage at 1313. By querying the indexes instead of the objects themselves search time is greatly improved. If a match is found, the object, objects, and/or tag information may be retrieved from storage as desired.

Figure 14:
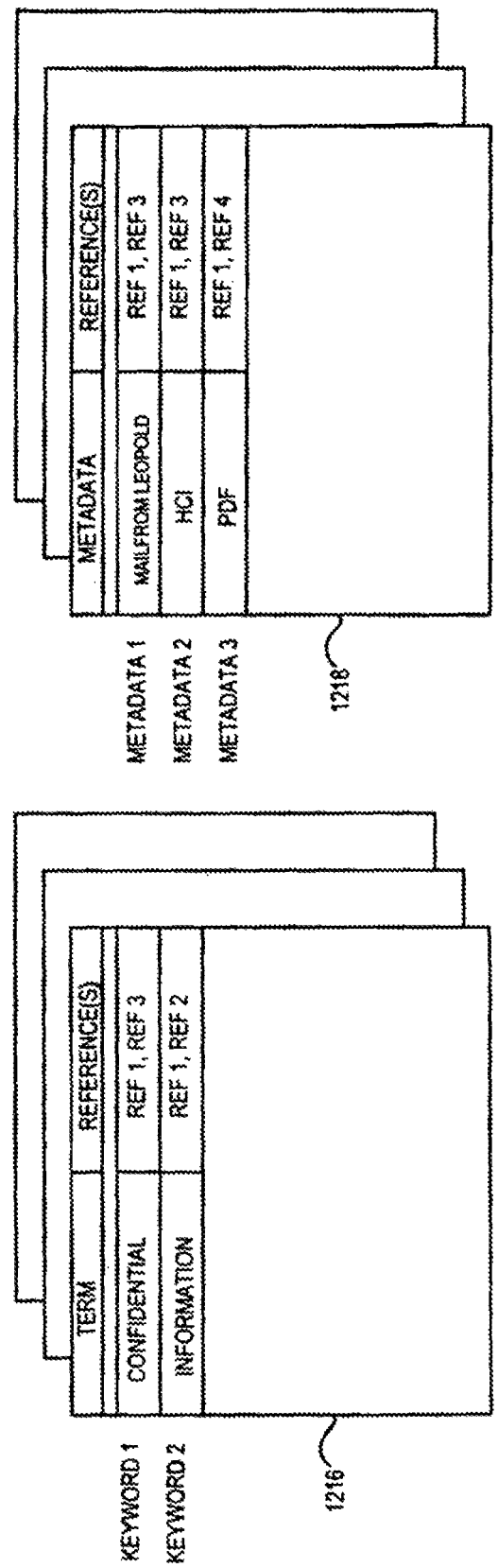
FIG. 14 illustrates an example of a keyword and metadata index at a particular point in time.

FIG. 14 illustrates an example of a keyword and metadata index at a particular point in time. Each entry in the keyword index 1216 data structure includes both a keyword found in a document and a reference to that document. For example, the keyword index 1216 data structure includes keywords "confidential" and "information." The keyword "confidential" was found by the capture system to be in documents "1" and "2." Accordingly, the keyword index 1216 includes references to those documents for "confidential." Similarly, each entry in the metadata index 1218 data structure includes both metadata data associated with a document and a reference to that document. For example, the metadata index 1218 data structure includes metadata "mailfrom Leopold" (indicating that an email originated from someone named "Leopold" contained a specific document), "health care information (HCI)" (indicating that a document included, generically, HCI), and "PDF" (indicating that a document was a PDF file).

The use of both a keyword index 1216 and metadata index 1218 allows for queries not possible with either a traditional keyword or metadata query. For example, by creating new index periodically (thereby having multiple indexes), a query of documents by time in addition to content is possible. In contrast, while a normal Internet search engine may be able to determine if a particular website has a particular keyword, that same search engine cannot determine if it had that same keyword 15 minutes ago, 1 week ago, etc. as these search engines employ one large index that does not account for time.

Additionally, previously there were no queries that could sort through both keyword and metadata. For example, a search for an email from a person named "Leopold," that contains a PDF attachment, HCI, and includes (either in the PDF or in the body of the email) the words "confidential" and "information" was impossible. Database queries only search for metadata stored in indexed columns (e.g., such as if the content is a PDF file, mail from information, etc.). These queries do not account for keywords, in other words, they cannot search for a particular document containing the words "confidential" and "information." Keyword queries (such as a Google query) cannot search for metadata such as the metadata described above.

Figure 15:
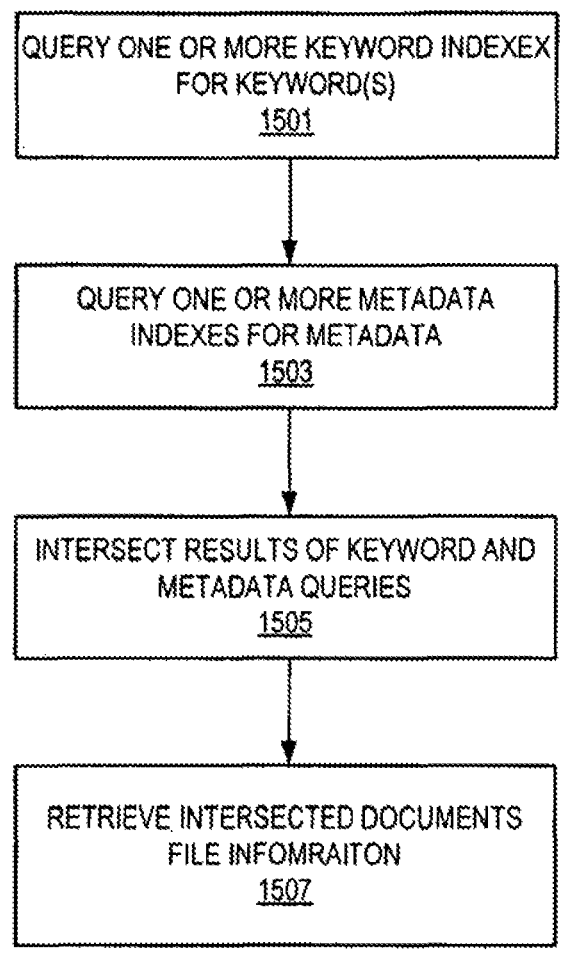
FIG. 15 illustrates a simplified exemplary querying flow using metadata and keyword indexing.
Figure 16A:
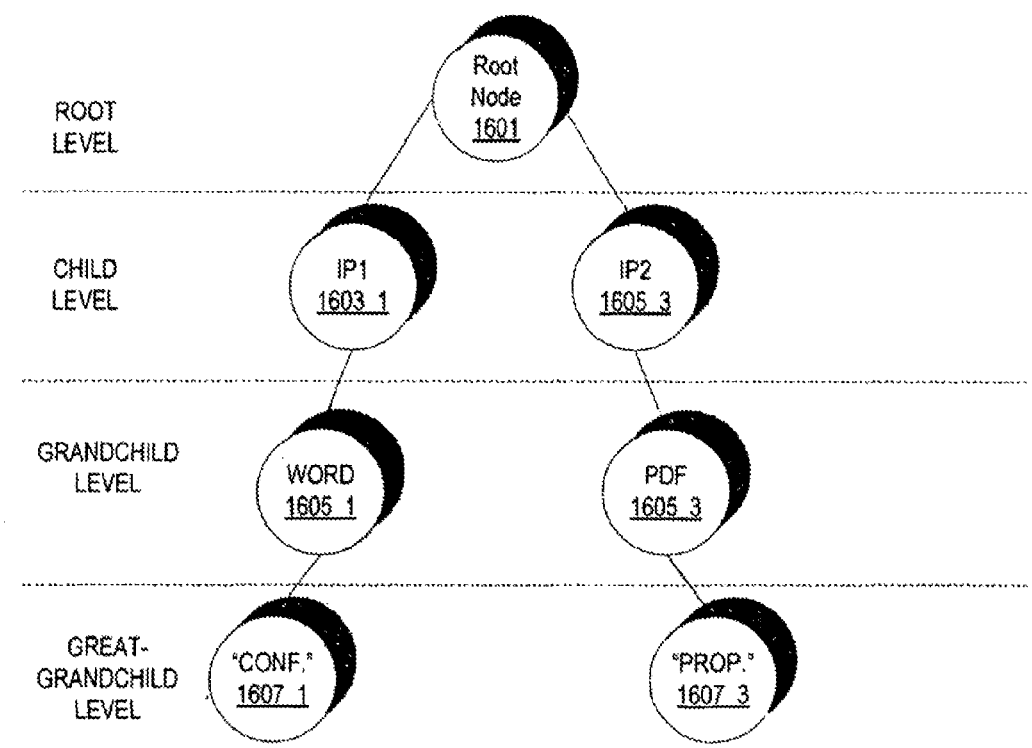
FIGS. 16(a)-(e) illustrate embodiments of controlled growth DAGs.
Figure 16B:
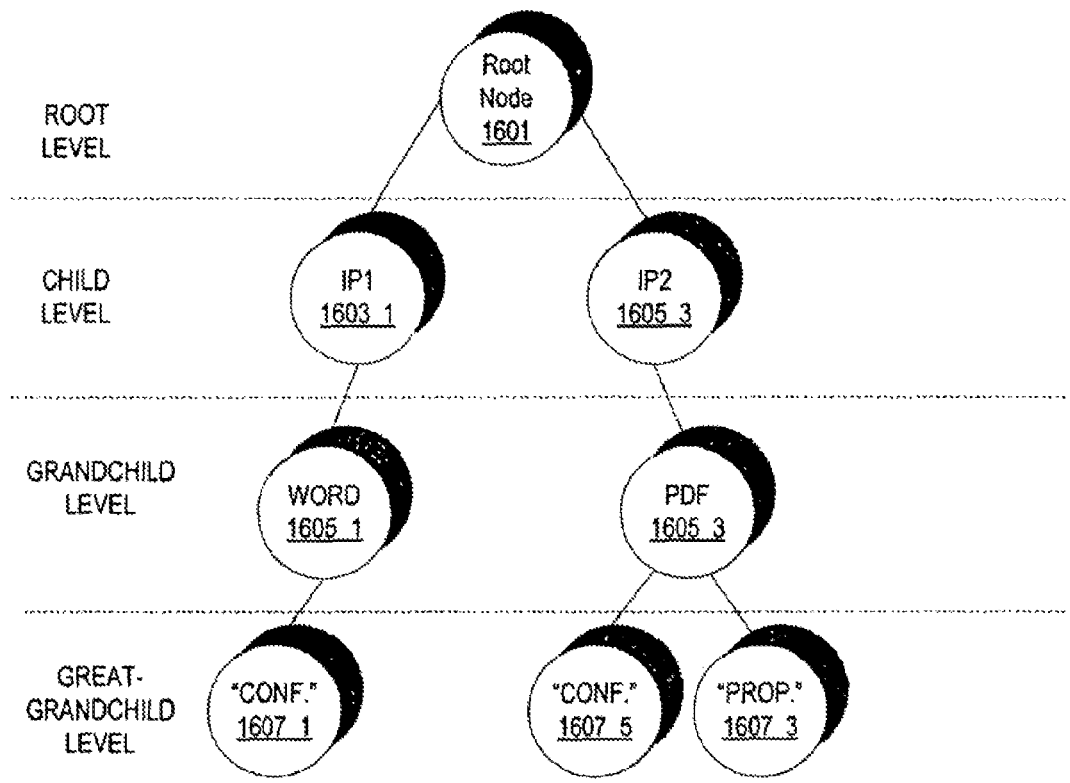
Figure 16C:
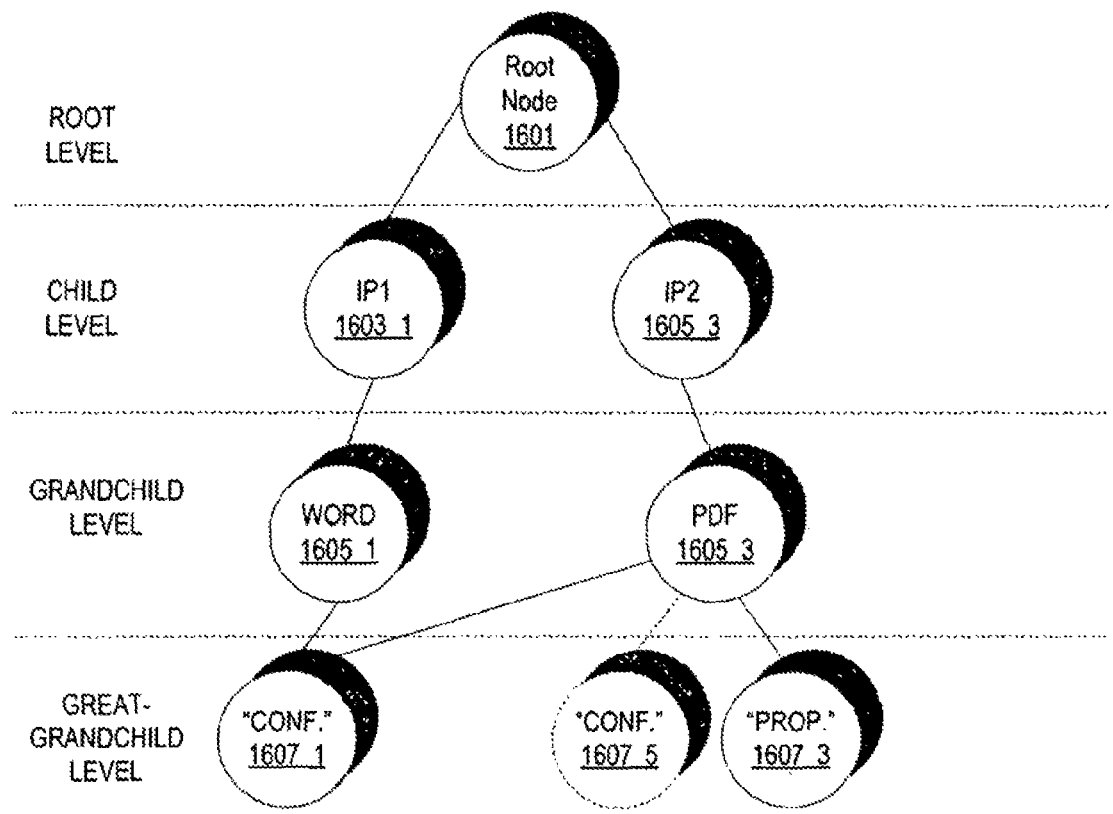
Figure 16D:
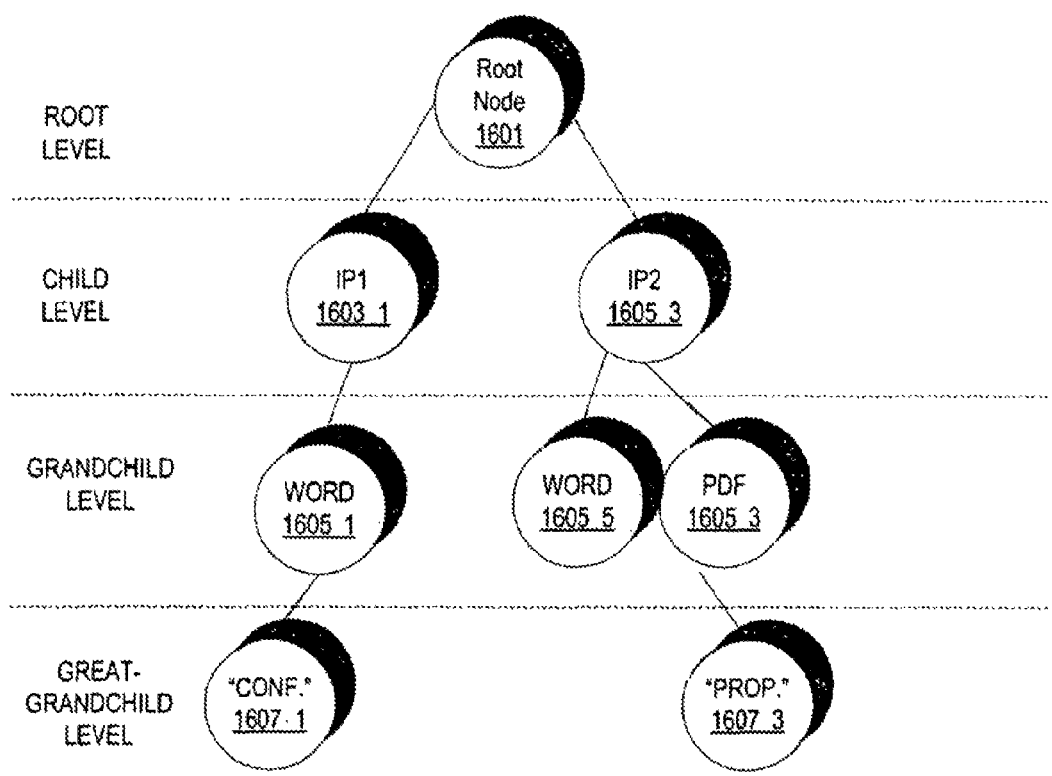
Figure 16E:
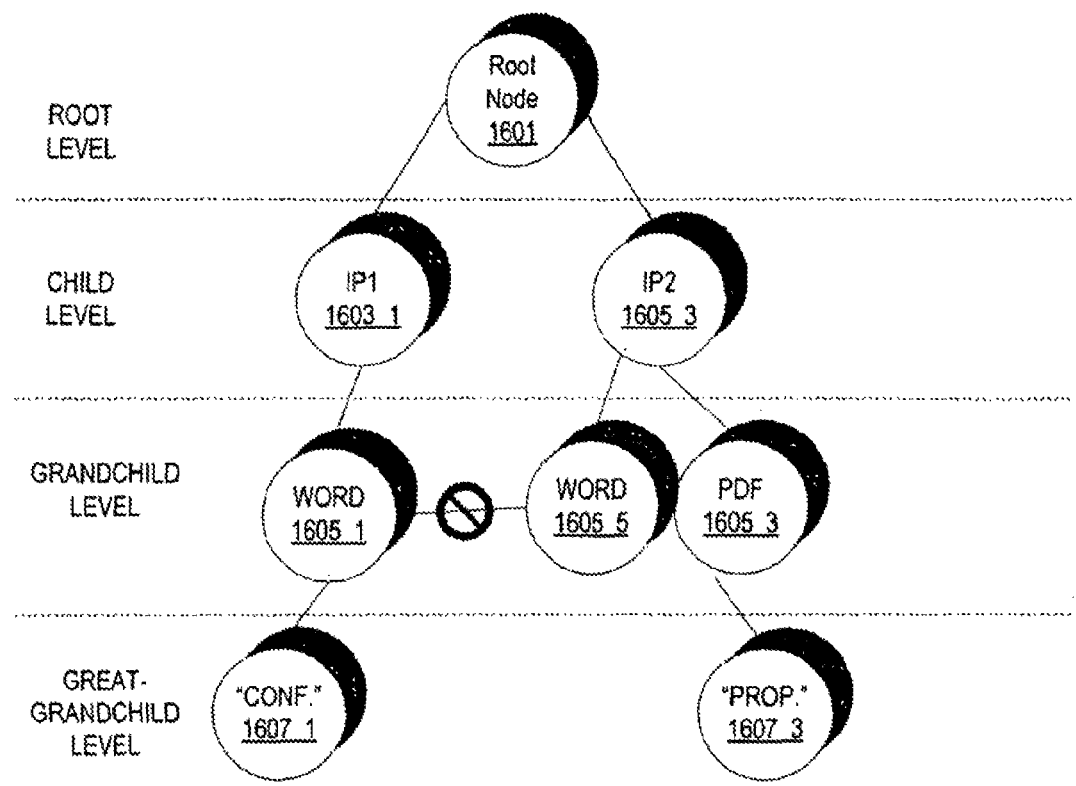

FIG. 15 illustrates a simplified exemplary querying flow using metadata and keyword indexing. At 1501, one or more keyword indexes are queried for one or more keywords. For example, in the query described above for the entries of FIG. 14, keyword indexes 1216 are queried for both "confidential" and "information." The result of this query is that "confidential" and "information" are only collectively found in reference 1. Essentially, the result of the query is the intersection of a query for "confidential" and a query for "information." Of course any Boolean operator such as OR, NOT, etc. may be used instead of or in conjunction with the Boolean AND. Also, natural language based queries may be supported.

The metadata indexes 1218 are similarly queried at 1503. For example, in the email query described above for the entries of FIG. 14, keyword indexes 1218 are queried for "HCI," "mailfrom Leopold," and "PDF." The result of this query is that this set of metadata is only collectively found in reference 1.

Because this search was not bound by a time frame, all available keyword and metadata indexes would be queried for these keywords. However, the number of keyword indexes queried is reduced for a time frame limited search.

At 1505, the results of the previous queries are intersected to create a set of references that satisfy the overall query. In the example above, the result of this intersection would be reference 1. Accordingly, only reference 1 would satisfy the collective query as it is the only reference to have all of the required criteria.

At 1507, the file information associated with the references from the intersection of 1505 is retrieved. Typically, as described earlier, this information is stored as a tag in a tag database and is retrieved from there. However, the actual documents associated with the references may be retrieved.

While this simplified query flow queries a keyword index prior to a metadata index query the reverse order may be performed. Additionally, many other variations on the simplified flow are possible. For example, while not as efficient, a query flow that performs an intersection after each index query (or after two, three, etc. queries) may be utilized. Another example is performing a query for a first specific time period (querying a first particular set of one keyword and one metadata index that were created/updated during the same time period), intersecting the results of the first query, performing a query on a second specific time period (querying a second particular set of one keyword and one metadata index that were created/updated during the same time period), intersecting the results of first query with the results of the second query, etc. Yet another example is performing a query for a first specific time period (querying a first particular set of one keyword and one metadata index that were created/updated during the same time period), intersecting the results of the first query, performing a query on a second specific time period (querying a second particular set of one keyword and one metadata index that were created/updated during the same time period), intersecting the results of the second query, etc. and when all (or some pre-determined number of) queries have been performed and intersections calculated for each specific time period, intersecting all of the specific period intersection results.

An optimization for the above described system uses adaptive cache alignment. Adaptive cache alignment means that the capture indexer (or some other entity including a user) aligns memory and/or disk data structures of the indexes (or index entries) to be the size of the system's processor's cache lines (for example, Level 2 (L2) memory cache within the system's processor—this processor has not been illustrated in this application in order to not unnecessarily clutter the figures). If the processor's capabilities are unknown, upon initialization the capture device's processor is examined and a determination of the appropriate cache alignment is made based upon that examination. Of course, the cache alignment may also be pre-determined if the exact system specifications are known. In another embodiment, the capture indexer (or other entity) examines the block size of the file system (of the fundamental storage unit) and uses this size as part of the cache alignment. Additionally, memory (such as RAM, cache, etc.) used by the capture indexer may be pre-allocated to remove the overhead of allocating memory during operation. Furthermore, algorithms operating on the memory are tolerant of uninitialized values being present upon first use. This allows for the usage of the memory without the latency associated with clearing or resetting the memory to a known state or value.

Rule Generation

The generation of a rule for a capture or capture/registration system is difficult for several reasons. The system administrator may not know exactly what content should be captured. Accordingly, historical patterns of previous user behavior may not be readily apparent. One way to help w/the generation of a rule is to perform association discovery.

Association discovery is an implication expression of the form X→Y, where X and Y are disjoint item sets. The strength of an association can be measured in terms of its support and confidence. Support determines how often a rule is applicable to a given data set, while confidence determines how frequently items in Y appear in transactions that contain X.

Unfortunately, association discovery is a computationally intensive task. One approach to association discovery is to use an FP-growth algorithm. FP-growth encodes a mining data set using a compact data structure called a FP-tree and extracts frequent item sets directly from this structure through a recursive condition FP-tree generation procedure. The FP-growth algorithm compresses a data set (FP-tree) by exploiting identical prefixes between item sets. Additionally, a FP-tree is essentially a prefix tree structure. However, for a huge volume of data, such as that processed by a capture system, the FP-growth approach will result in a memory explosion (the FP-tree will quickly consume all available memory thereby bringing whatever system it is to a crawl).

Another approach is to use controlled growth directed acyclic graphs (DAGs) to address association discovery for huge volume data set. A DAG is a directed graph without a directed cycle. This approach controls the DAG growth and herein will be referred to as DAG controlled growth. Through controlled growth DAG, a DAG is compressed by exploiting not only identical prefixes, but also identical suffixes. Controlled growth DAG significantly reduces memory or storage footprints and yet maintains the FP-tree's recursive conditional summary properties. Controlled growth DAGs may be generated on-the-fly (for example, by a capture system, etc.) or generated from previous processed transactions (for example, a batch of stored tags). These controlled growth DAGs may be stored locally in a capture or capture/registration system in volatile memory (such as RAM) or involatile memory (such as a hard drive, optical disk, flash, etc.), or stored outside of a capture or capture/registration system such as in a database.

FIGS. 16(*a*)-(*e*) illustrate embodiments of controlled growth DAGs. As is typical of a DAG, what is illustrated in FIG. 16 is a tree-like structure. FIG. 16(*a*) illustrates a simple controlled growth DAG for tag information according to an embodiment. Accordingly, each node (other than the root node) reflects information found in a tag. At the very top level is the root level. At the root level there are one or more root nodes 1601 (only one root node is illustrated to simply the discussion). From the root node 1601, several children 1603 may be referenced in the child level. In this particular controlled growth DAG, each child node 1603_1 and 1603_3 represents a different IP address. For example, child node 1603_1 represents the IP address "IP1."

The next level of the controlled growth DAG is the grandchild level. For the particular embodiment illustrated, the grandchild level corresponds to a content type level. At this level nodes for various content types are located. For example, there is a grandchild node for Word documents 1605_1 and another for PDF documents 1605_3.

The level following the grandchild level is the great-grandchild level. For the particular embodiment illustrated, the great-grandchild level corresponds to an attribute level. In other words, at this level various attributes of the nodes of the grandchild level are referenced. For example, as illustrated the Word document node 1605_1 included the phrase "confidential" (confidential is abbreviated as "Conf." in the figure) and this is noted by the "Conf." node 1607_1. Similarly, the text "Property" (property is abbreviated as "Prop." in node 1607_3) appeared in a PDF 1605_3.

Traversing this controlled growth DAG illustrates properties of transactions, documents, etc. For example, this DAG shows that a Word document that contained the phrase "Confidential" was sent to or received by IP1. Also note that the nodes of the child level are prefixes to the grandchild level (likewise the nodes of the grandchild level are prefixes to the great-grandchild level) and that nodes of the great-grandchild level are suffixes to the grandchild level (likewise the nodes of the grandchild level are suffixes to the child level).

Of course the values illustrated in FIG. 16 are illustrative and are not meant to be inclusive of all possible values. For example, the child level may reflect users instead of IP addresses, etc.

FIG. 16(*b*) illustrates an embodiment of a controlled growth DAG that includes multiple nodes of the same value in the same level. As illustrated, the great-grandchild level includes two nodes for "Confidential" (nodes 1607_1 and 1607_5). The node 16075 indicates that "Confidential" was found in a PDF.

FIG. 16(*c*) illustrates the controlled growth DAG of FIG. 16(*b*) that has undergone a suffix adjustment. In this figure, the second "Confidential" node (node 1607_05) has been removed and a link (reference) to the first "Confidential" node (node 1607_1) is added to the PDF node 1605_03. The removal of this node compresses the controlled growth DAG. While the controlled growth DAG has been compressed, it still conveys the same information found in FIG. 16(*b*). In other words, this compressed version still shows that IP2 sent or received a PDF with the word "Confidential," but does so with one fewer node. Each node removed saves memory space. In systems with millions of records this type of reduction results in a controlled growth DAG that requires only a few megabytes as opposed to general gigabytes a FP-tree or conventional DAG would occupy.

FIG. 16(*d*) illustrates an embodiment of a controlled growth DAG with multiple nodes in the grandchild level. In this controlled growth DAG, there are two Word document nodes (nodes 1605_1 and 1605_5). One Word document was sent or received by IP1 and included the text "Confidential." The other Word document was sent or received by IP2 and did not include this text. Unlike the example of multiple nodes in the great-grandchild level of FIG. 16(*c*) this in not a good candidate for suffix reduction because if node 1605_05 was removed the controlled growth DAG would not correctly convey what IP2 sent or received. If the node 1605_05 was removed and a link to Word node 1605_01 was made from IP2 node 1605_03, it would mean that IP2 sent or received a Word document with the text "Confidential." This illustrates a property of controlled growth DAGS—that suffixes may only be removed if an only if the same information can be conveyed without the node by adding a link to an existing node.

Figure 17:
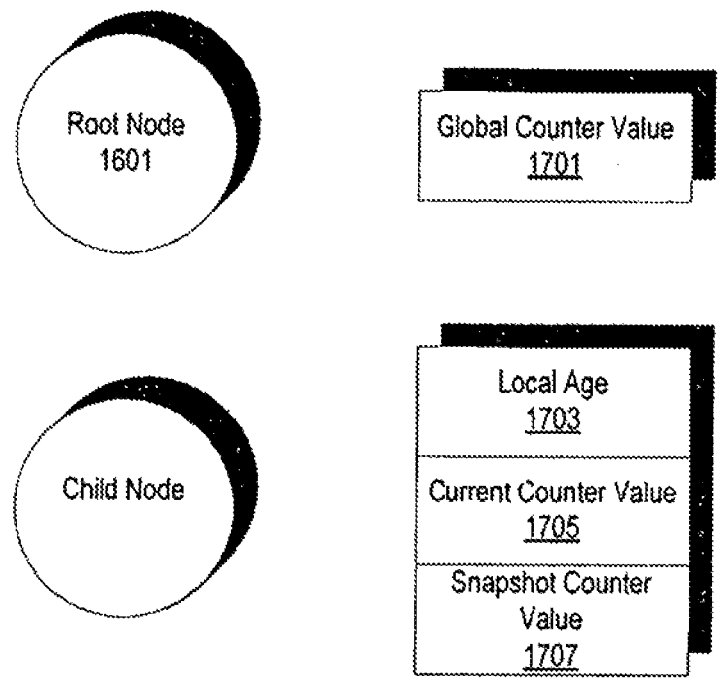
FIG. 17 illustrates the contents of different nodes of a controlled growth DAG according to an embodiment.

FIG. 17 illustrates the contents of different nodes of a controlled growth DAG according to an embodiment. Root nodes 1601 include a global counter value 1701. This global counter value reflects the "age" of the controlled growth DAG itself. This age is increased when a snapshot of the system is created. For example, a DAG with a global counter value of two is older than a controlled growth DAG with a global counter of 1. Of course, different numerical conventions may be utilized. For example, in some embodiments, as the global counter value decreases the DAG is considered to be younger than a controlled growth DAG with a larger global counter value. For simplicity, the following description assumes that a controlled growth DAG with a larger global counter value is older.

Nodes below the root level (child nodes 1603, grandchildren 1605, great-grandchildren 1607, etc.—for simplicity they are referred to as child nodes in the following discussion) include at least a local age 1703, current counter value 1705, and a snapshot counter value 1707. The local age 1703 reflects the number of changes made to a particular node. Accordingly, the local age is updated when a change to the node occurs such as the node being referenced by a tag value.

The counter values 1705 and 1707 reflect the two latest ages for the node. These counters note how many times a node has occurred in the controlled growth DAG. For example, in a Word document node of FIG. 16 the current counter value 1705 reflects the number of times a Word document was sent or received by a particular IP address. The snapshot counter value 1707 in the same node is the current age of the node at a set point in time.

Additionally, nodes may also contain a link (or links) to one or more nodes in other levels. For example, the Word node 1605_1 may contain a link to the "Confidential" attribute node 1607_1. The child node may also contain a link or links to an object(s) or tag(s) in storage. These links could also be stored in a separate data structure.

Creating and Maintaining a Controlled Growth DAG

Figure 18:
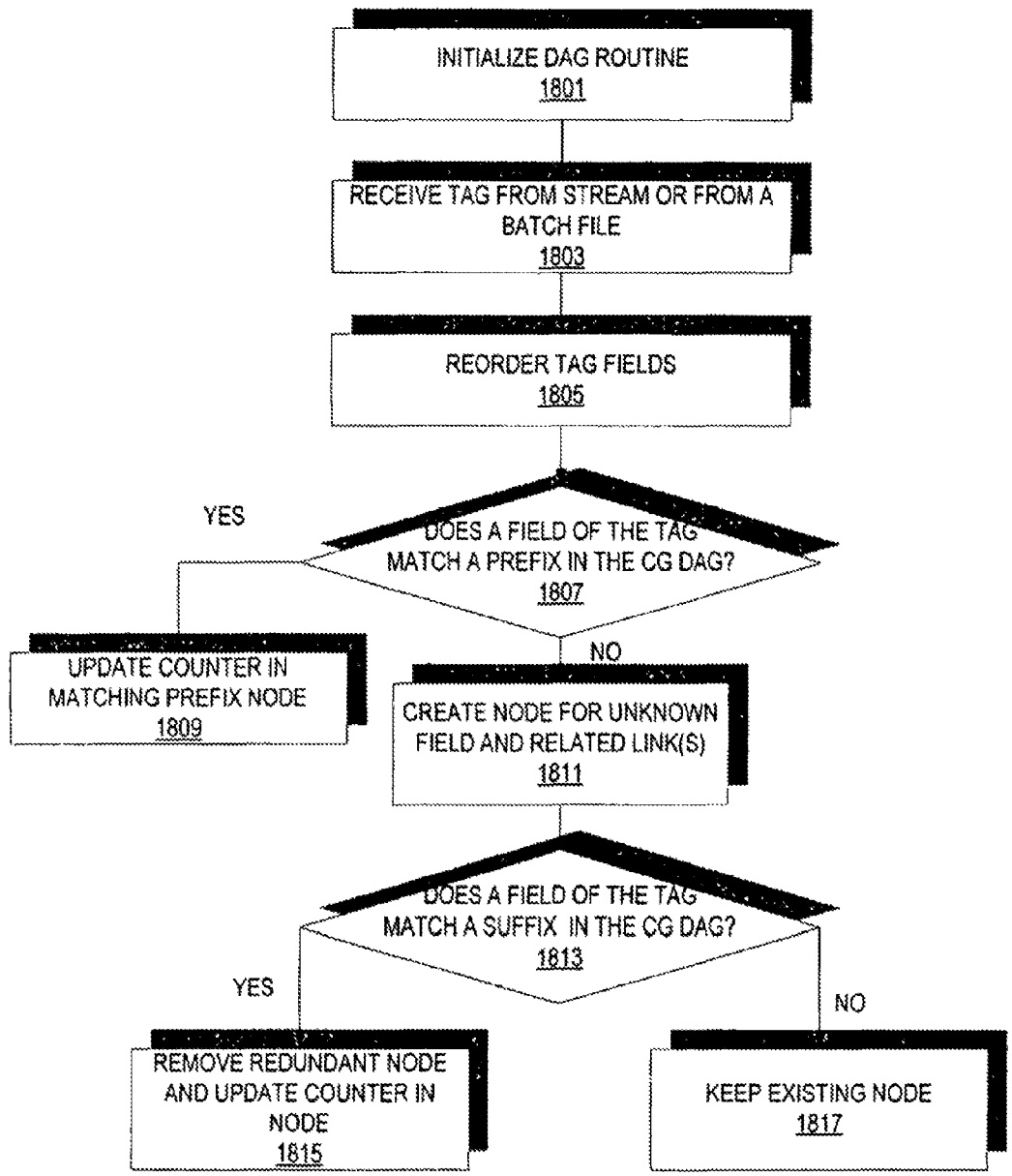
FIG. 18 illustrates an embodiment of a flow for a method to modify a controlled growth DAG.

FIG. 18 illustrates an embodiment of a flow for a method to modify a controlled growth DAG. At 1801, a controlled growth DAG routine is initialized. This routine seeds a controlled growth DAG with a root node thus creating a controlled growth DAG. From this root node other nodes will be added to reflect transactions captured or registered by a capture or capture/registration device.

At a later point in time, 1803, a tag is received from a stream on-the-fly, or from a batch file, that contains or references previously processed and stored tags. The contents of an exemplary tag have been discussed.

At 1805, the tag fields may be reordered to better suit how the controlled growth DAG is configured. For example, the tag fields may be reordered such that they appear in the order of the levels of the controlled growth DAG (root level to child level, etc. or great-grandchild level to grandchild level, etc.)

The controlled growth DAG is then processed to determine if a new node should be added. A determination of if a field of the tag matches a prefix node in the controlled growth DAG is made at 1807. This determination may be made by traversing the controlled growth DAG starting at the root node. If the field does match a prefix node, that prefix node is updated. What is updated is the node depends on the node's local age. If the prefix node's local age is equal to the global age of the controlled growth DAG (as found in the root node), the current counter value of the node is updated. For example, if the field of the tag stated that this tag concerned a Word document sent from IP1, the current counter 1705 of a node 1605 would be updated. Typically, when updating, the value is incremented. However, in other embodiments the value is decremented upon updating. Additionally, on or more links may be added.

If the prefix node's local age is older than the global age of the controlled growth DAG (as found in the root node), the current counter value of the node is copied to the snapshot counter (replacing the snapshot counter value), the local age of the node is updated to be the global age, and the current counter value is updated. For example, in this situation if the field of the tag stated that this tag concerned a Word document sent from IP1, the current counter value 1705 replaces the snapshot counter value 1707, the local age 1701 is changed to be the value of the global age, and the current counter value 1705 is updated. Again, typically, when updating the value is incremented. However, in other embodiments the value is decremented upon updating. Additionally, one or more links may be added.

If the tag field does not match a prefix in the controlled growth DAG, a new node is created at 1811. This new node is created at the appropriate level for the field. This node's local age is equal to the global age of the controlled growth DAG. Depending upon the implementation, the current counter value and snapshot counter value of the node are set to 1. Of course, any other number may be used. Additionally, the node is populated with one or more links to previous nodes as applicable. These links reflect the path "up" the controlled growth DAG toward the root node (denoting the link to the proceeding node or nodes).

In order to control the size of the controlled growth DAG it is compressed by looking at suffix nodes and eliminating redundant nodes. At 1813, a determination of if the tag field matches a suffix in the controlled growth DAG is made. If the tag field does not match a suffix, no nodes are removed from the graph at 1817.

If the tag field matches a suffix, the redundant node is removed and one or more values in the non-redundant (older) node are updated at 1815. For example, in FIG. 16(b), there are two "Confidential" nodes (nodes 1607_1 and 1607_5). The recently added node 1607_5 is ripe for removal from the graph. Once this node is removed, node 1607_1 must be changed. The links of this node will be updated to include a link to PDF node 1605_3. If the prefix node's local age is equal to the global age of the controlled growth DAG (as found in the root node), the current counter value of the node is updated as described earlier. If the prefix node's local age is older than the global age of the controlled growth DAG (as found in the root node), the current counter value of the node is copied to the snapshot counter (replacing the snapshot counter value), the local age of the node is updated to be the global age, and the current counter value is updated as described earlier.

Each node removed makes the controlled growth DAG smaller thereby shrinking its memory footprint. Adding link or updating counter or local age values to an existing node has negligible, or no impact, on the controlled growth DAG's memory footprint. In systems that do not use a controlled growth DAG and use a regular DAG of FP-tree several gigabytes of memory may be used. A controlled growth DAG typically has a memory footprint in the low hundreds of megabytes or lower. Additionally, searching a graph with fewer nodes is less processor and time intensive.

The above described flow may be repeated for any tag fields. In one or more embodiments, the method is altered such that each prefix is processed before the suffix compression. Additionally, in one or more embodiments, controlled growth DAGs are generated according to periods for time. For example, a new controlled growth DAG may be generated every hour, day, etc. with the previous controlled growth DAG stored to local storage and/or persisted to a database.

Association Discovery for Rule Creation

At any time, an end user may want to perform association discovery on tags up to the current point of time. Unfortunately, a conventional lock paradigm of not processing any tags while this discovery is taking place is not ideal or satisfactory. In other words, the capture or capture/registration system has to be shutdown when using a conventional lock paradigm. The use of a controlled growth DAG provides a much more desirable solution for this type of discovery.

Figure 19:
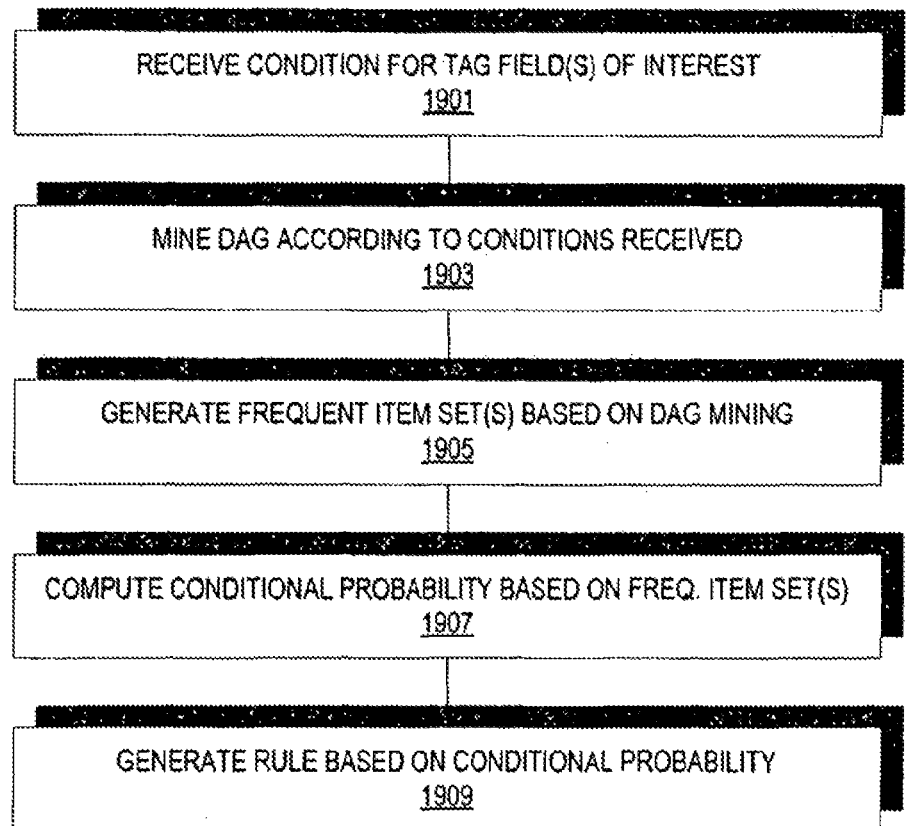
FIG. 19 illustrates an embodiment of a flow of a method to generate a rule from mining a controlled growth DAG.

FIG. 19 illustrates an embodiment of a flow of a method to generate a rule from mining a controlled growth DAG. At 1901, a user provides conditions for tag field(s) of interest. For example, the user may want to find out how many objects were sent or received via the network that contained the phrase "confidential." These conditions are provided to an association discovery engine. This engine may be located on a capture or capture/registration device or external to either. If the engine is outside of the capture or capture/registration device it needs to have access to the tags generated and/or stored by the device(s) and/or the controlled growth DAG associated with the device(s).

Figure 20:
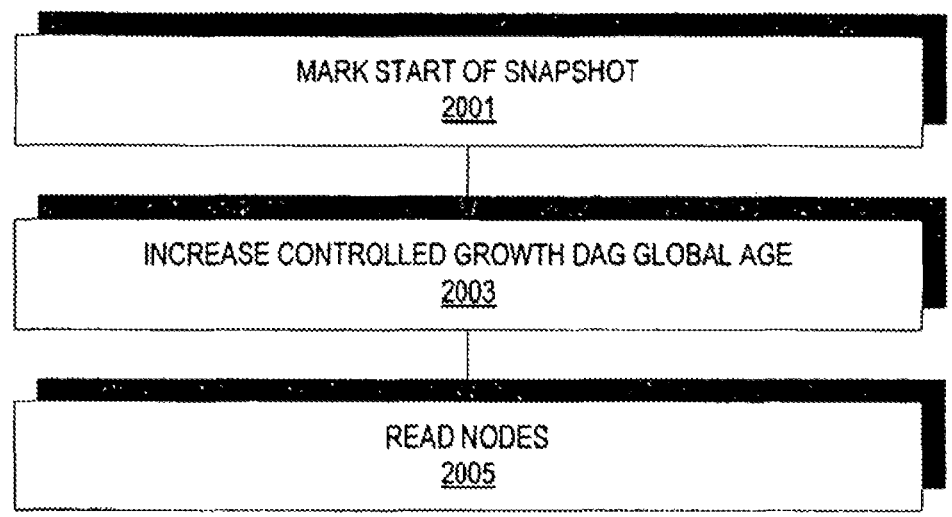
FIG. 20 illustrates an embodiment of a method to data mine a controlled growth DAG.

A controlled growth DAG is mined according to the provided conditions at 1903. Of course, if a controlled growth DAG has not yet been created, it should be created now. A controlled growth DAG maybe mined by traversing the relevant paths as required by the conditions. For example, if the condition is to find the objects with the phrase "confidential" and who they belong to there are several paths that should be traversed. There are numerous ways to traverse the controlled growth DAG. In an embodiment, the path begins at the root node and ends at the relevant node that has the required condition. For example, the path of root node to IP1 1603_1 to Word document node 1605_1 to "Confidential" node 1607_1. In another embodiment, the traversal begins at the desired level. This is possible because of the relationship between a tag and the levels of the graph. For example, in the graph of FIG. 16 the phrase "confidential" is on the attribute level. From this level, the graph is traversed up to the root as necessary (it may not be necessary to go all the way up the graph). A method for data mining is illustrated in FIG. 20.

Based on the results of the data mining, a frequent item set (or sets) is created at 1905. This set illustrates the number of times the desired event occurred. For example, a frequent item set may illustrate the number of Word documents that contained "confidential," the number of emails that contained "confidential," etc. from the user. One or more sets of global values may also be generated. For example, the number of Word documents sent or received by a particular user may be tallied (if that has not already been done).

From this set, one or more conditional probabilities are calculated at 1907. Conditional probabilities use the frequent item sets and global values to give an end user a better idea of what types of activities are occurring. For example, if a 90% of the user's Word documents contained "confidential" then this may be something that should be tracked in greater detail. This ratio of 90% is conditional probability and shows that the vast majority of the time the user sends or receives Word documents with "confidential" in them.

From this information, an end user that wants to make a rule has a better idea of what the rule should try to accomplish. At 1909, the user provides the conditions for one or more rules and/or policies to the capture system, capture/registration system, or some administrative entity that provides rules and policies to capture and/or capture/registration systems. Existing rules may also be changed by the end user based on this information.

An Embodiment of a Data Mine Method of a Controlled Growth DAG

FIG. 20 illustrates an embodiment of a method to data mine a controlled growth DAG. At 2001, a snapshot (or copy) of the controlled growth DAG is created. This snapshot represents the controlled growth DAG at a particular point in time.

At 2003, the global age of the controlled growth DAG is increased to reflect that a snapshot has been created by increasing the global age value of the root node.

The controlled growth DAG is processed at 2005. Relevant graph node data that is older than the global age is read. Typically, relevant graph node data is the data along the path to the desired information. For example, the nodes along the path IP1 to "Confidential" have relevant data for the search described earlier. If the node's local age is older than the global age then the current version value is read providing the number of times of an occurrence (such as the number of times "confidential" appeared). If the node's local age is younger than the global age then the snapshot value is read. Nodes that are created after the creation of the snapshot are not read. Each required node is searched and evaluated. This snapshot algorithm is contention free and efficient through lazy evaluation and sharing of the graph link structure. In an alternative embodiment, the snapshot is traversed instead of the controlled growth DAG itself. This allows the search to be "offline" and not interfere with the operation of the capture or capture/registration system that generated the controlled growth DAG.

System

Figure 21:
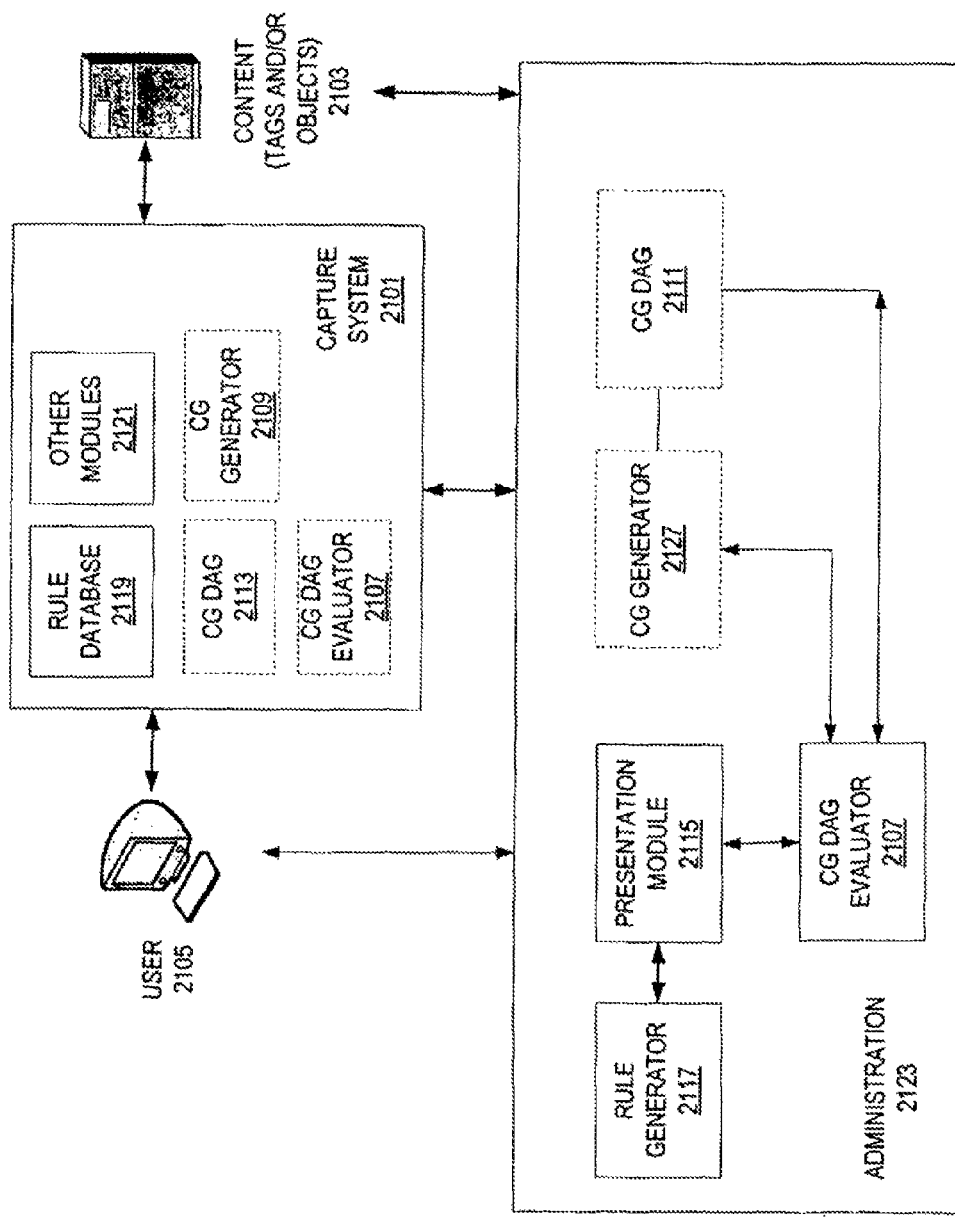
FIG. 21 illustrates an embodiment of a management system of a capture or capture/registration system.

FIG. 21 illustrates an embodiment of a management system of a capture or capture/registration system. A capture system 2101, as described above, captures and/or registers objects as required by the capture system's 2101 rules and policies. In order to simplify the illustration, the modules previously described are denoted as "other modules" 2121. In an embodiment, the capture system 2101 includes a rule database 2119 (or other storage device such as RAM) to store the rules used by the capture system 2101. In other embodiments, the rules are stored off of the capture system 2101, but are still accessible to the capture system 2101. The rule database may also include policies or the policies may be stored off of the captures system 2101. A user's system 2105 may access the capture system 2101 to do one or more of the following: 1) view or retrieve a rule; 2) view or retrieve a tag; 3) view or retrieve an object; 4) generate a controlled growth DAG; 5) access a controlled growth DAG, evaluate a controlled growth DAG; 6) etc. Also illustrated is an external storage location(s) 2103 to store tags and/or objects including controlled growth DAGs. Of course, as described earlier, this storage 2103 may be local to the capture system 2101.

An administration system 2123 typically include the necessary modules to generate a controlled growth DAG (CG Generator 2115) and evaluate a controlled growth DAG (CG DAG evaluator 2125). Additionally, controlled growth DAGs 2111 may be stored in the administration system 2123. The administration system 2123 also may include a rule generator 2117 to generate a capture system rule or policy based on input from a user. However, in some embodiments one or more of these modules (CG Generator 2109, CG DAG evaluator 2107, and rule generator 2117 (not shown) and/or storage (CG DAG 2113) are in the capture system 2101.

The administration system 2123 may be a separate entity, as illustrated, or incorporated into either the user system 2105 or capture system 2101. As shown, the user system 2105 is a "dumb" terminal that has access to both the capture 2101 and administration 2123 systems, through for example, presentation module 2115. For example, the user system 2105 may connect through a software program such as a Web browser to receive information from the capture system 2101 or administration system 2123.

As described earlier, a controlled growth DAG is generated using tags and/or objects from the capture system 2101 or storage 2103. The CG generator ZZ27 creates a controlled growth DAG 2111 from this information which may be evaluated by the CG DAG evaluator 2125. The controlled growth DAG 2111 or its evaluation may be presented to a user via the presentation module 2115.

Closing Comments

An article of manufacture may be used to store program code. An article of manufacture that stores program code may be embodied as, but is not limited to, a machine-readable storage medium such as one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In one embodiment, a capture system is an appliance constructed using commonly available computing equipment and storage systems capable of supporting the software requirements.

Figure 22:
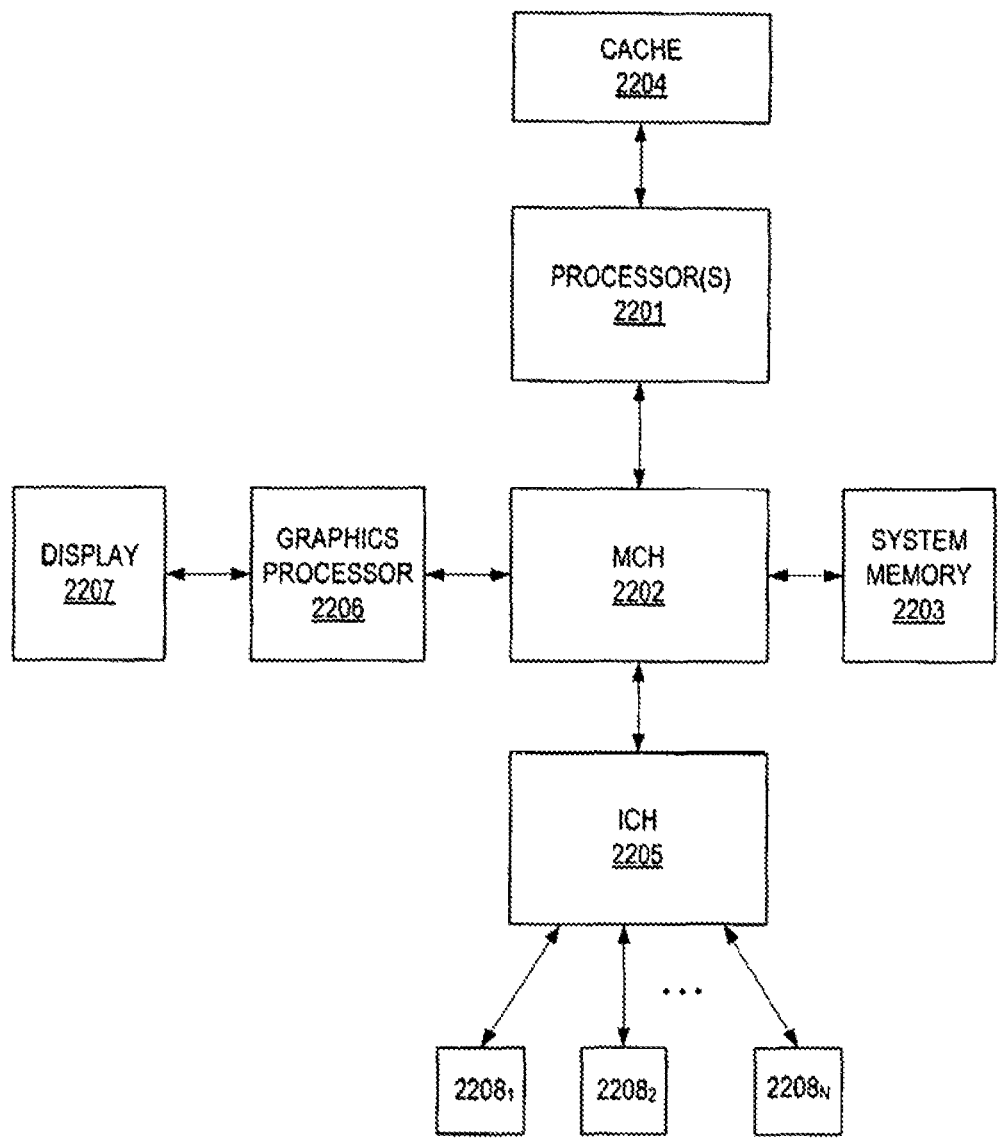
FIG. 22 shows an embodiment of a computing system (e.g., a computer).

FIG. 22 shows an embodiment of a computing system (e.g., a computer). The exemplary computing system of FIG. 22 includes: 1) one or more processors 2201; 2) a memory control hub (MCH) 2202; 3) a system memory 2203 (of which different types exist such as DDR RAM, EDO RAM, etc,); 4) a cache 2204; 5) an I/O control hub (ICH) 2205; 6) a graphics processor 2206; 7) a display/screen 2207 (of which different types exist such as Cathode Ray Tube (CRT), Thin Film Transistor (TFT), Liquid Crystal Display (LCD), Digital Light Processing (DLP), Organic LED (OLED), etc.; and 8) one or more I/O and storage devices 2208.

The one or more processors 2201 execute instructions in order to perform whatever software routines the computing system implements. The instructions frequently involve some sort of operation performed upon data. Both data and instructions are stored in system memory 2203 and cache 2204. Cache 2204 is typically designed to have shorter latency times than system memory 2203. For example, cache 2204 might be integrated onto the same silicon chip(s) as the processor(s) and/or constructed with faster SRAM cells whilst system memory 2203 might be constructed with slower DRAM cells. By tending to store more frequently used instructions and data in the cache 2204 as opposed to the system memory 2203, the overall performance efficiency of the computing system improves.

System memory 2203 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 2203 prior to their being operated upon by the one or more processor(s) 2201 in the implementation of a software program. Similarly, data that a software program determines should be sent from the computing system to an outside entity through one of the computing system interfaces, or stored into an internal storage element, is often temporarily queued in system memory 2203 prior to its being transmitted or stored.

The ICH 2205 is responsible for ensuring that such data is properly passed between the system memory 2203 and its appropriate corresponding computing system interface (and internal storage device if the computing system is so designed). The MCH 2202 is responsible for managing the various contending requests for system memory 2203 access amongst the processor(s) 2201, interfaces and internal storage elements that may proximately arise in time with respect to one another.

One or more I/O devices 2208 are also implemented in a typical computing system. I/O devices generally are responsible for transferring data to and/or from the computing system (e.g., a networking adapter); or, for large scale non-volatile storage within the computing system (e.g., hard disk drive). ICH 2205 has bi-directional point-to-point links between itself and the observed I/O devices 2208. A capture program, classification program, a database, a filestore, an analysis engine and/or a graphical user interface may be stored in a storage device or devices 2208 or in memory 2203.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Thus, a capture system and a document/content registration system have been described. In the forgoing description, various specific values were given names, such as "objects" and "documents," and various specific modules, such as the "registration module" and "signature database" have been described. However, these names are merely to describe and illustrate various aspects of the present invention, and in no way limit the scope of the present invention. Furthermore, various modules may be implemented as software or hardware modules, combined, or without dividing their functionalities into modules at all. The present invention is not limited to any modular architecture either in software or in hardware, whether described above or not.

What is claimed is:
1. A method, comprising:
  capturing, by an electronic computing device, an object traversing a network environment;
  storing the captured object; and
  indexing the stored object according to tags, keywords and metadata, wherein the tags include information about the object and the tags are placed into a tag index, wherein the keywords are generated from a content of the object and the keywords are placed into a keyword index, and wherein the metadata is generated from properties of the object and the metadata is placed into a metadata index;

wherein the indexing is performed utilizing an adaptive time-based dictionary granularity with new keyword indexes and metadata indexes being created over time prevent a specific index from growing unbounded and a temporal basis for creating the new keyword indexes and the metadata indexes is determined by a plurality of factors, including: a) a number of keywords or metadata that have been inserted into the keyword index or the metadata index, respectively; b) a number of captured objects listed in each of the keyword index and the metadata index; c) an aggregate size of each of the keyword index and the metadata index; and d) an aggregate size of captured content being indexed.

2. The method of claim 1, wherein the tags include at least one selection from a group comprising: a MAC address, a source Internet Protocol (IP) address of the object, a destination IP address of the object, a source port number of the object, a destination port number of the object, a protocol that carried the object, an instance of the object, a content type of the object, an encoding used by the protocol, a size of the object, a timestamp corresponding to a time when the object was captured, an owner requesting the capture of the object, a configuration corresponding to a capture rule directing the capture of the object, a signature of the object, and a signature of the tags.

3. The method of claim 1, wherein each entry in the keyword index includes a keyword and a reference to a corresponding associated object, and wherein each entry in the metadata index includes a metadata and a reference to a corresponding associated object.

4. The method of claim 1, wherein the keyword index and the metadata index are part of a single file per time period.

5. The method of claim 1, further comprising:
querying the keyword index for search keywords;
retrieving a first tag information corresponding to a first set of objects having the search keywords;
querying the metadata index for search metadata;
retrieving a second tag information corresponding to a second set of objects having the search metadata; and
intersecting the first tag information and the second tag information to determine a third tag information corresponding to a third set of objects having the search keywords and the search metadata.

6. The method of claim 1, wherein the creation of new indexes is additionally controlled by employing heuristics to optimize search performance, wherein the heuristics are provided by a user or an administrator.

7. The method of claim 1, further comprising:
performing a first query, comprising querying a first keyword index for search keywords and a first metadata index for search metadata, wherein the first keyword index and the first metadata index were created during a first time period;
retrieving a first tag information corresponding to a first set of objects having the search keywords and the search metadata over the first time period;
performing a second query comprising querying a second keyword index for the search keywords and a second metadata index for the search metadata, wherein the second keyword index and the second metadata index were created during a second time period;
retrieving a second tag information corresponding to a second set of objects having the search keywords and the search metadata over the second time period; and
intersecting the first tag information and the second tag information to determine a third tag information corresponding to a third set of objects having the search keywords and the search metadata over the first time period and the second time period.

8. A non-transitory machine-readable storage medium including program code which, when executed by a processor, causes the processor to perform a method, the method comprising:
capturing an object traversing a network environment;
storing the captured object; and
indexing the stored object according to tags, keywords and metadata, wherein the tags include information about the object and the tags are placed into a tag index, wherein the keywords are generated from a content of the object and the keywords are placed into a keyword index, and wherein the metadata is generated from properties of the object and the metadata is placed into a metadata index;

wherein the indexing is performed utilizing an adaptive time-based dictionary granularity with new keyword indexes and metadata indexes being created over time prevent a specific index from growing unbounded and a temporal basis for creating the new keyword indexes and the metadata indexes is determined by a plurality of factors, including: a) a number of keywords or metadata that have been inserted into the keyword index or the metadata index, respectively; b) a number of captured objects listed in each of the keyword index and the metadata index; c) an aggregate size of each of the keyword index and the metadata index; and d) an aggregate size of captured content being indexed.

9. The non-transitory machine-readable storage medium of claim 8, wherein the tags include at least one selection from a group comprising: a MAC address, a source Internet Protocol (IP) address of the object, a destination IP address of the object, a source port number of the object, a destination port number of the object, a protocol that carried the object, an instance of the object, a content type of the object, an encoding used by the protocol, a size of the object, a timestamp corresponding to a time when the object was captured, an owner requesting the capture of the object, a configuration corresponding to a capture rule directing the capture of the object, a signature of the object, and a signature of the tags.

10. The non-transitory machine-readable storage medium of claim 8, wherein the method further comprises:
querying the keyword index for search keywords;
retrieving a first tag information corresponding to a first set of objects having the search keywords;
querying the metadata index for search metadata;
retrieving a second tag information corresponding to a second set of objects having the search metadata; and
intersecting the first tag information and the second tag information to determine a third tag information corresponding to a third set of objects having the search keywords and the search metadata.

11. The non-transitory machine-readable storage medium of claim 8, wherein the creation of new indexes is additionally controlled by employing heuristics to optimize search performance, wherein the heuristics are provided by a user or an administrator.

12. The non-transitory machine-readable storage medium of claim 8, wherein the method further comprises:
performing a first query, comprising querying a first keyword index for search keywords and a first metadata index for search metadata, wherein the first keyword index and the first metadata index were created during a first time period;

retrieving a first tag information corresponding to a first set of objects having the search keywords and the search metadata over the first time period;

performing a second query comprising querying a second keyword index for the search keywords and a second metadata index for the search metadata, wherein the second keyword index and the second metadata index were created during a second time period;

retrieving a second tag information corresponding to a second set of objects having the search keywords and the search metadata over the second time period; and intersecting the first tag information and the second tag information to determine a third tag information corresponding to a third set of objects having the search keywords and the search metadata over the first time period and the second time period.

13. An apparatus, comprising:

a memory for storing data; and a processor operable to execute instructions associated with the data, wherein the apparatus is configured for:

capturing an object traversing a network environment;

storing the captured object; and indexing the stored object according to tags, keywords and metadata, wherein the tags include information about the object and the tags are placed into a tag index, wherein the keywords are generated from a content of the object and the keywords are placed into a keyword index, and wherein the metadata is generated from properties of the object and the metadata is placed into a metadata index;

wherein the indexing is performed utilizing an adaptive time-based dictionary granularity with new keyword indexes and metadata indexes being created over time prevent a specific index from growing unbounded and a temporal basis for creating the new keyword indexes and the metadata indexes is determined by a plurality of factors, including: a) a number of keywords or metadata that have been inserted into the keyword index or the metadata index, respectively; b) a number of captured objects listed in each of the keyword index and the metadata index; c) an aggregate size of each of the keyword index and the metadata index; and d) an aggregate size of captured content being indexed.

14. The apparatus of claim 13, wherein the tags include at least one selection from a group comprising: a MAC address, a source Internet Protocol (IP) address of the object, a destination IP address of the object, a source port number of the object, a destination port number of the object, a protocol that carried the object, an instance of the object, a content type of the object, an encoding used by the protocol, a size of the object, a timestamp corresponding to a time when the object was captured, an owner requesting the capture of the object, a configuration corresponding to a capture rule directing the capture of the object, a signature of the object, and a signature of the tags.

15. The apparatus of claim 13, further configured for:

querying the keyword index for search keywords;

retrieving a first tag information corresponding to a first set of objects having the search keywords;

querying the metadata index for search metadata;

retrieving a second tag information corresponding to a second set of objects having the search metadata; and intersecting the first tag information and the second tag information to determine a third tag information corresponding to a third set of objects having the search keywords and the search metadata.

16. The apparatus of claim 13, wherein the creation of new indexes is additionally controlled by employing heuristics to optimize search performance, wherein the heuristics are provided by a user or an administrator.

17. The apparatus of claim 13, further configured for:

performing a first query, comprising querying a first keyword index for search keywords and a first metadata index for search metadata, wherein the first keyword index and the first metadata index were created during a first time period;

retrieving a first tag information corresponding to a first set of objects having the search keywords and the search metadata over the first time period;

performing a second query comprising querying a second keyword index for the search keywords and a second metadata index for the search metadata, wherein the second keyword index and the second metadata index were created during a second time period;

retrieving a second tag information corresponding to a second set of objects having the search keywords and the search metadata over the second time period; and intersecting the first tag information and the second tag information to determine a third tag information corresponding to a third set of objects having the search keywords and the search metadata over the first time period and the second time period.

* * * * *

UNITED STATES PATENT AND TRADEMARK OFFICE
CERTIFICATE OF CORRECTION

PATENT NO.         : 8,601,537 B2                                   Page 1 of 1
APPLICATION NO.    : 13/424249
DATED              : December 3, 2013
INVENTOR(S)        : Weimin Liu It is certified that error appears in the above-identified patent and that said Letters Patent is hereby corrected as shown below:

In the Drawings:

On sheet 14 of 25, in Figure 15, Reference Numeral 1501, line 1, delete "INDEXEX" and insert -- INDEXES --, therefor.

On sheet 14 of 25, in Figure 15, Reference Numeral 1507, line 2, delete "INFOMRAITION" and insert -- INFORMATION --, therefor.

Signed and Sealed this
First Day of April, 2014

Michelle K. Lee
*Deputy Director of the United States Patent and Trademark Office*